United States Patent
Tajima et al.

(10) Patent No.: US 9,621,272 B2
(45) Date of Patent: Apr. 11, 2017

(54) OPTICAL TRANSMISSION DEVICE AND CONTROL METHOD FOR THE SAME

(71) Applicant: NEC Corporation, Minato-ku, Tokyo (JP)

(72) Inventors: Akio Tajima, Tokyo (JP); Kenji Mizutani, Tokyo (JP)

(73) Assignee: NEC CORPORATION, Tokyo (JP)

(*) Notice: Subject to any disclaimer, the term of this patent is extended or adjusted under 35 U.S.C. 154(b) by 47 days.

(21) Appl. No.: 14/416,681

(22) PCT Filed: Jul. 24, 2013

(86) PCT No.: PCT/JP2013/004491
§ 371 (c)(1),
(2) Date: Jan. 23, 2015

(87) PCT Pub. No.: WO2014/017083
PCT Pub. Date: Jan. 30, 2014

(65) Prior Publication Data
US 2015/0180579 A1   Jun. 25, 2015

(30) Foreign Application Priority Data

Jul. 25, 2012   (JP) ................... 2012-164257

(51) Int. Cl.
 H04B 10/032   (2013.01)
 H04B 10/40    (2013.01)
 H04J 14/02    (2006.01)
(52) U.S. Cl.
 CPC .......... H04B 10/40 (2013.01); H04J 14/0212 (2013.01); H04J 14/0213 (2013.01); H04J 14/0217 (2013.01); H04J 14/0227 (2013.01)
(58) Field of Classification Search
 CPC .................................................. H04B 10/032
 See application file for complete search history.

(56) References Cited

U.S. PATENT DOCUMENTS

| 7,099,578 B1* | 8/2006 | Gerstel | H04J 14/0295 |
| | | | 370/216 |
| 2005/0210191 A1* | 9/2005 | Kobayashi | G06F 3/0625 |
| | | | 711/114 |
| 2007/0183786 A1* | 8/2007 | Hinosugi | H04B 10/40 |
| | | | 398/140 |

FOREIGN PATENT DOCUMENTS

| JP | 2009-71345 A | 4/2009 |
| JP | 2009-100442 A | 5/2009 |
| JP | 2012-4800 A | 1/2012 |

OTHER PUBLICATIONS

International Search Report for PCT Application No. PCT/JP2013/004491, mailed on Aug. 27, 2013.

(Continued)

Primary Examiner — Shi K Li

(57) ABSTRACT

[Problem to be Solved]
There is provided an optical transmission device in wavelength-division-multiplexing-based optical communications that has both of improved reliability because of provision of backup optical transceiving unit and power saving capability because of appropriate control.
[Solution]
An optical transmission device is configured with optical switch means 40, a plurality of optical transceiving means 41 and control means 42. The optical switch means 40 outputs an input optical signal to a given path. Each optical transceiving means 41 receives an optical signal from the optical switch means 40 and transmits an optical signal to the optical switch means 40. The control means 42 performs various kinds of control. The optical transceiving means 41 operates in three operation states: a normal mode in which the optical transceiving means transmits and receives optical signals, a first standby mode which is a standby state, and a second standby mode in which power consumption is (Continued)

smaller than power consumption in the first standby mode. The control means 42 includes means for causing the optical transceiving means in the first standby mode to transition to the normal mode and causes the optical transceiving means in the second standby mode to transition to the first standby mode or the normal mode.

15 Claims, 23 Drawing Sheets

(56) References Cited

OTHER PUBLICATIONS

Kenji Mizutani, et al., A highly resilient and power saving cut-through-routing node based on multi-standby state power saving transponders, 2012 17th Opto-Electronics and Communications Conference (OECC), Jul. 2, 2012, pp. 407-408.

A. Morea, et al., Power management of optoelectronic interfaces for dynamic optical networks, 2011 37th European Conference and Exhibition on Optical Communication (ECOC), Sep. 18, 2011, pp. 1-3.

K. Mizutani, et al., Demonstration of multi-degree color/direction-independent waveguide-based transponder-aggregator for flexible optical path networks, 2010 36th European Conference and Exhibition on Optical Communication (ECOC), Sep. 19, 2010, pp. 1-3.

Dominique Verchere, et .al., Routing protocol enhancements for power state engineering of green network elements, 2012 17th European Conference on Networks and Optical Communications (NOC), Jun. 20, 2012, pp. 1-4.

\* cited by examiner

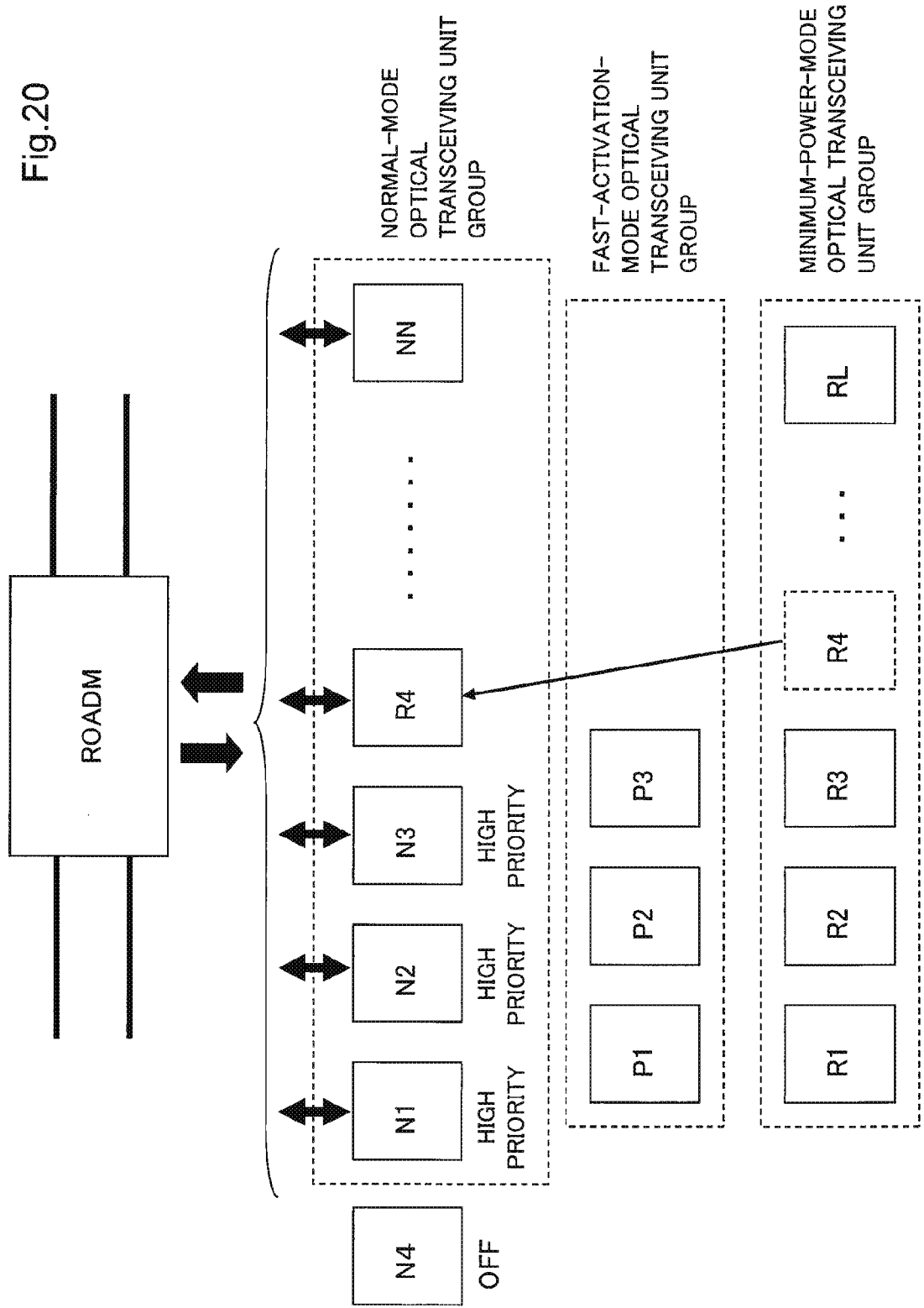

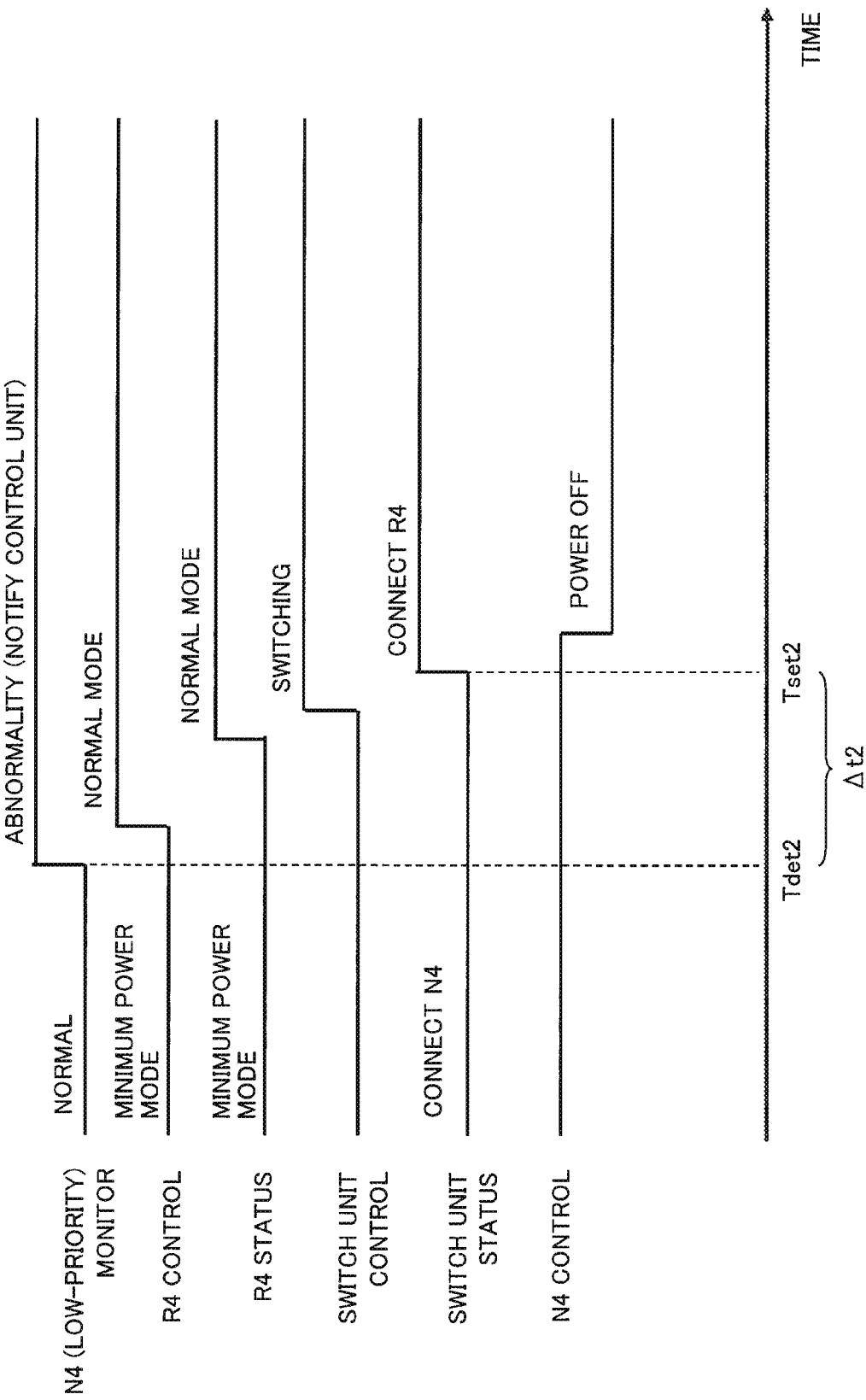

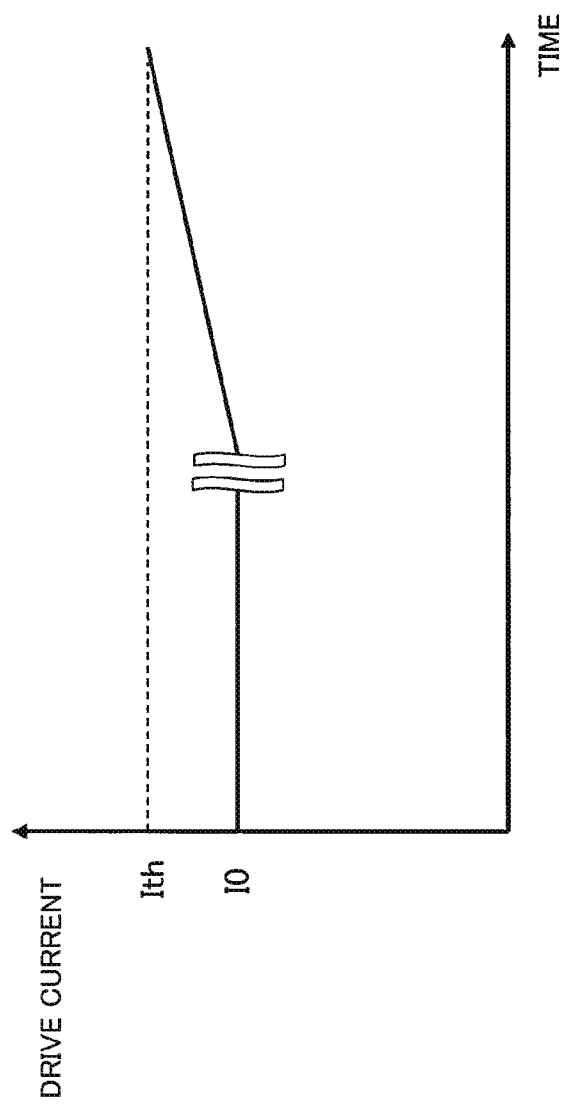

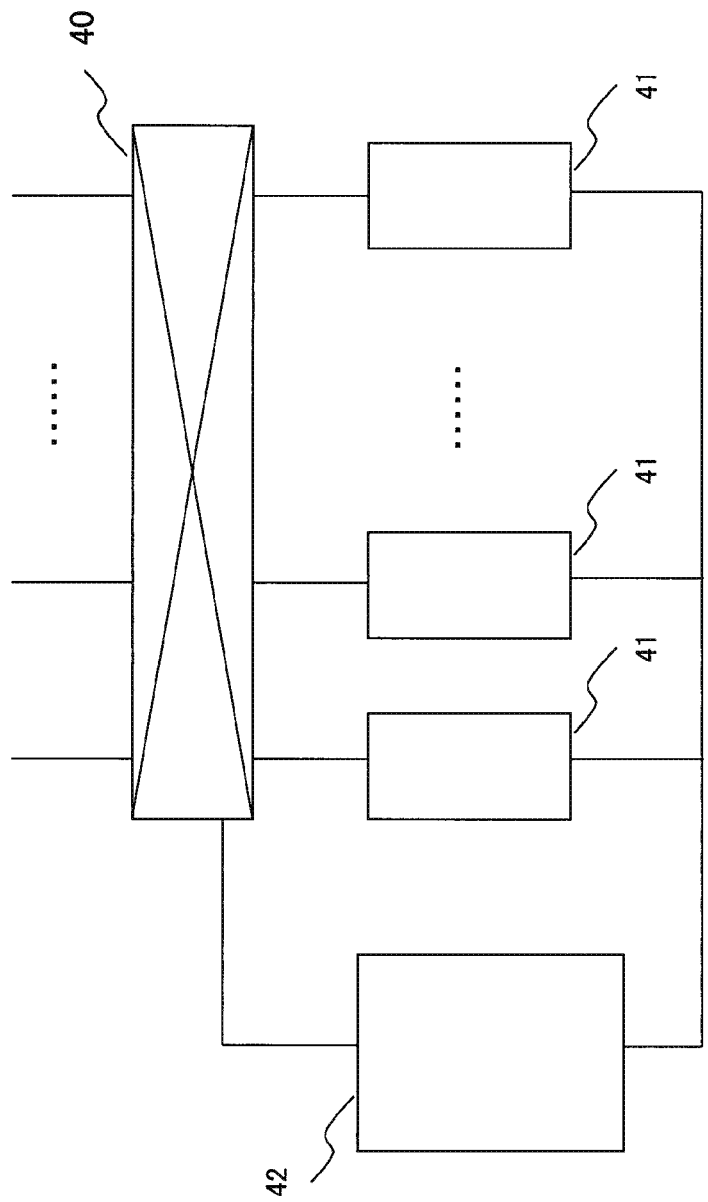

OPTICAL TRANSMISSION DEVICE AND CONTROL METHOD FOR THE SAME

This application is a National Stage Entry of PCT/JP2013/004491 filed on Jul. 24, 2013, which claims priority from Japanese Patent Application 2012-164257 filed on Jul. 25, 2012, the contents of all of which are incorporated herein by reference, in their entirety.

TECHNICAL FIELD

The present invention relates to a technique relating to optical communication and, in particular, to an optical transmission device using wavelength-division multiplexing and a method for controlling the optical transmission device.

BACKGROUND ART

With the development of the information society, the traffic of information is dramatically increasing. With the increase, optical communication, which enables fast and high-capacity transmission, is becoming widely used. Because of the growth of the social importance of information-communication, there is a growing demand for reliable communication networks.

Various techniques are being developed in order to accommodate the increase in traffic and meet the demand for reliability of communications in the field of optical communication. On the other hand, as a result of attempts to configure high-capacity and reliable networks, the configurations of networks are becoming more and more complicated and the number of optical transmission devices used are increasing. Consequently, the power consumption in optical network systems and optical transmission devices used for the networks are increasing. Accordingly, the importance of optical network systems capable of power saving while maintaining reliability and optical transmission devices used for such optical network systems is increasing and related techniques are being actively developed. For example, PTL 1 discloses a technique for improving the reliability of optical transmission devices.

PTL 1 describes a wavelength-division-multiplexing-based optical transmission device including a backup optical transceiving unit. The optical transmission device in PTL 1 includes separate optical transceiving units for high speed communication and low speed communication and a backup optical transceiving unit designed to the same specifications as those of the optical transceiving units used for high speed and low speed communications. The optical transmission device has monitoring and control functions for detecting failures or the like in the optical transceiving units. When a failure of in an optical transceiving unit is detected, switching is done to the backup optical transceiving unit. The provision of the backup optical transceiving units in the optical transmission device enables quick switching in the event of a failure.

Power saving techniques for optical network systems such as a technique in PTL 2 are disclosed. PTL 2 discloses a technique relating to power saving in interface units of an optical network system. The optical network system in PTL 2 includes an interface units associated with backup paths. The interface units associated with the backup paths are placed in a power saving mode when a backup path is chosen and, when a failure occurs, the interface units exit from the power saving mode and are used for communication in a normal active mode. PTL 2 claims that the function of putting the interface units of the backup path on standby in the power saving mode allows power saving of the entire network system.

PTL 3 discloses a technique that controls the timing of supplying power to optical transceiving units in an optical transmission device made up of a plurality of optical transceiving units. The optical transceiving units in PTL 3 have a normal operation mode and two power saving modes. When the optical transceiving units are switched from a power saving mode to the normal operation mode, the timing of supplying power to the optical transceiving units is controlled. PTL 3 claims that a malfunction can be avoided by controlling the timing of switching the optical transceiving units to the normal mode to prevent an abrupt voltage drop.

CITATION LIST

Patent Literature

PTL 1: Japanese Laid-open Patent Publication No. 2012-4800

PTL 2: Japanese Laid-open Patent Publication No. 2009-100442

PTL 3: Japanese Laid-open Patent Publication No. 2009-71345

SUMMARY OF INVENTION

Technical Problem

However, the technique disclosed in PTL 1 has the following problem. The optical transmission device described in PTL 1 includes a backup optical transceiving unit. However, PTL 1 does not disclose a power supply management technique or the like of the optical transceiving units. Accordingly, if the number of backup optical transceiving units is increased in order to improve the reliability of the optical transmission device, power consumption may increase.

The technique disclosed in PTL 2 provides backup interface units in a power saving mode and makes switching to the backup interface units in the event of a failure. However, PTL 2 does not disclose a technique, which is used in optical transceiving units for example, that controls key components of the optical transmission device individually and finely. Accordingly, a certain range of units need to be collectively operated in order to improve the reliability, which can prevent sufficient power saving.

PTL 3 discloses a configuration in which optical transceiving units in a normal operation mode and two power saving modes are provided. However, PTL 3 does not disclose that backup optical transceiving units are individually switched between different operation modes and used while communication is being actually performed. Accordingly, the technique cannot be used as a technique for improving the reliability of an optical transmission device and an optical network system in terms of failure recovery and the like.

An object of the present invention is to provide an optical transmission device that has both of improved reliability because of provision of backup optical transceiving units and power saving capability because of appropriate control.

Solution to Problem

To achieve the object, an optical transmission device according to the present invention includes optical switch means, a plurality of optical transceiving means, and control means. The optical switch means outputs an input optical signal to a given path. The optical transceiving means receives optical signals from the optical switch means and transmits optical signals to the optical switch means. The control means controls the optical switch means and the optical transceiving means. The optical transceiving means operates in three different operation states: a normal mode in which the optical transceiving means transmits and receives optical signals, a first standby mode in which the optical transceiving means does not transmit nor receive optical signals, and a second standby mode in which power consumption in the standby state is smaller than power consumption in the first standby mode. The control means includes means for causing optical transceiving means in the first standby mode to transition to the normal mode and causing optical transceiving means in the second standby mode to transition to the first standby mode or the normal mode.

A control method for an optical transmission device according to the present invention places optical transceiving means transmitting and receiving optical signal in three different operation states. The three different operation states are: a normal mode in which optical transceiving units transmit and receive optical signals, a first standby mode in which optical transceiving units do not transmit nor receive optical signals, and a second standby mode in which power consumption in a standby state is lower than power consumption in the first standby mode. The control method for the optical transmission device causes optical transceiving means in the first standby mode to transition to the normal mode and causes optical transceiving means in the second standby mode to transition to the first standby mode or the normal mode.

Advantageous Effects of Invention

According to the present invention, since backup optical transceiving units in a standby state in which some of the elements of the backup optical transceiving units are active is provided, quick switching can be made from an optical transceiving unit that is being used in optical signal transmission/reception to a backup optical transceiving unit. In the event of a failure in the optical transceiving unit, quick switching can be made to reduce the communication shutdown time. Accordingly, the reliability of the optical transmission device is improved. Furthermore, since backup optical transceiving units in two standby modes are provided, the number of optical transceiving means in the one of the standby modes in which more power is consumed can be reduced. Thus, in the optical transmission device according to this embodiment, both of improvement of the reliability and power saving can be achieved.

BRIEF DESCRIPTION OF DRAWINGS

FIG. 20 is a diagram illustrating an exemplary configuration of the third embodiment of the present invention.

FIG. 21 is a diagram illustrating an exemplary operation in the third embodiment of the present invention.

FIG. 22 is a diagram illustrating an example of measured values in the third embodiment of the present invention.

FIG. 23 is a diagram illustrating an overview of a configuration of a fourth embodiment of the present invention.

DESCRIPTION OF EMBODIMENTS

Figure 1:
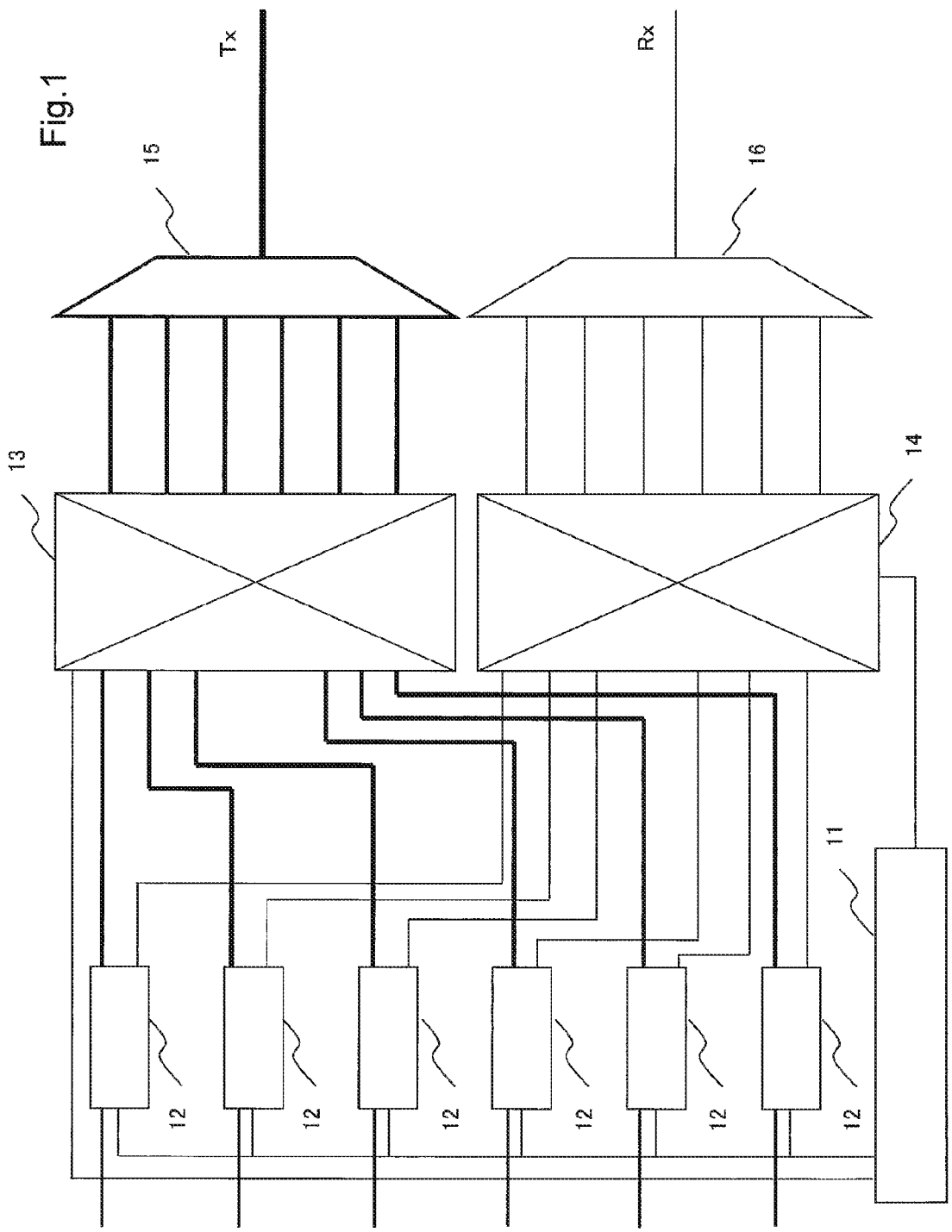
FIG. 1 is a diagram illustrating an overview of a configuration of a first embodiment of the present invention.

A first embodiment of the present invention will be described with reference to FIG. 1. FIG. 1 is a diagram illustrating an overview of a configuration of an optical transmission device according to this embodiment.

The optical transmission device of this embodiment includes a control unit 11, optical transceiving units 12, transmission-side optical switch unit 13, a reception-side optical switch unit 14, a multiplexing unit 15, and demultiplexing unit 16. The optical transmission device of this embodiment includes a plurality of optical transceiving units 12 and one or more transmission-side optical switch units 13, reception-side optical switch units 14, multiplexing units 15 and demultiplexing units 16 depending on the network and device designs.

The control unit 11 includes the function of controlling the entire optical transmission device. The control unit 11 issues, to the optical transceiving units 12, instructions to start and stop transmission and reception of optical signals, indications of the wavelengths of optical signals to be received and transmitted, an instruction to enter a standby state, and other instructions relating to operations of the optical transceiving units 12 to control the optical transceiving units 12. The control unit 11 issues an instruction to the transmission-side optical switch unit 13 to make path switching to control the transmission-side optical switch unit 13. The control unit 11 also issues an instruction to the reception-side optical switch unit 14 to make path switching to control the reception-side optical switch unit 14.

Each of the optical transceiving units 12 includes a semiconductor laser and is capable of transmitting an optical signal with a given wavelength. The wavelength of an optical signal that can be transmitted by the optical transceiving unit 12 is tunable. The optical transceiving unit 12 transmits an optical signal with a given wavelength according to an instruction from the control unit 11. The given wavelength is a wavelength allocated to each optical signal according to the design of the entire network. The optical transceiving unit 12 includes a photodiode and includes the function of receiving optical signals. The optical transceiving unit 12 is sometimes called a transponder.

The optical transceiving unit 12 includes the function of operating in a plurality of operation modes. The operation modes are classified according to a predetermined criterion in controlling whether or not elements making up the optical transceiving unit 12 are activated in accordance with communication status. For example, the operation modes are classified according to a criterion such as what percent of the elements of the entire device are active. The operation mode can also be classified according to the amount of power consumption relative to the power consumption when the entire device is active. The operation modes can be set as operation mode classifications by setting whether or not to activate each of the elements in each of the operation modes.

The operation modes of the optical transceiving units 12 of this embodiment are classified into three: a normal mode, a fast activation mode and minimum power mode. The normal mode is a mode in which the optical transceiving unit 12 is being used for optical signal transmission/reception and is able to transmit/receive an optical signal in quick response to an instruction from the control unit 11. The fast activation mode and the minimum power mode are standby states in which the optical transceiving unit 12 is not in use for transmission nor reception of an optical signal. In a standby state, some or all of the elements making up the optical transceiving unit 12 are deactivated to reduce power consumption. The fast activation mode in this embodiment is a standby state in which the percentage of the elements making up the optical transceiving unit 12 that are active are greater than that in the minimum power mode.

The optical transceiving unit 12 includes the function of transitioning from a standby state to the normal mode or transitioning from the normal mode to a standby state in response to an instruction from the control unit 11. The optical transceiving unit 12 in the fast activation mode can transitions to the normal mode in response to an instruction from the control unit 11 in a shorter time than in the minimum power mode because a larger percent of the elements are active than in the minimum power mode. On the other hand, the power consumption in the standby mode in the fast activation mode is greater than the power consumption in the minimum power mode because a larger percent of the elements are active than in the minimum power mode. The optical transceiving unit 12 in the minimum power mode takes a longer time to transition to the normal active mode in response to an instruction from the control unit 11 because a larger percent of the elements are inactive in the standby state in the minimum power mode than in the fast activation mode. On the other hand, the power consumption in the minimum power mode is the smallest in the standby state because a larger percent of the elements are inactive in the standby state than in the other modes.

One way to reduce the time taken to transition from the fast activation mode to the normal mode is, for example, to keep elements that take long time to stabilize after activation active while the optical transceiving unit 12 is in the standby state. Stabilizing means that variations in the intensity of a signal converge in a certain range because of stabilization of temperature or current in the device, for example. Keeping elements that take long time to stabilize active in the standby state allows the optical transceiving unit 12 to transition to the normal mode in a short time in response to an instruction from the control unit 11. On the other hand, in the minimum power mode, elements that take a long time to stabilize are not kept active, thereby reducing the power consumption. Whether or not to activate each of the elements in the fast activation mode and the minimum power mode may be set according to power consumption. Alternatively, elements degradation of which is accelerated by frequent power on may be kept active in the fast activation mode and may be kept inactive in the minimum power mode.

The transmission-side optical switch unit 13 and the reception-side optical switch unit 14 include the function of converting paths of input optical signals into a matrix and outputting the optical signals. Optical MEMS (Micro Electro Mechanical Systems) switches, for example, may be used as the transmission-side optical switch unit 13 and the reception-side optical switch unit 14.

The transmission-side optical switch unit 13 is capable of outputting optical signals input from the optical transceiving units 12 to any of the output ports. The transmission-side optical switch unit 13 selects paths according to an instruction from the control unit 11 that is based on a combination of the wavelength design of the entire network and wavelength settings of the optical transceiving units 12 and outputs an optical signal to an output port according to the instruction from the control unit 11.

The multiplexing unit 15 includes the function of multiplexing input optical signals having different wavelengths and outputting multiplexed optical signal. The multiplexing unit 15 may be an arrayed waveguide grating, for example.

The reception-side optical switch unit 14 is capable of outputting an optical signal demultiplexed and input by the demultiplexing unit 16 to any of the output ports. The reception-side optical switch unit 14 selects a path according to an instruction from the control unit 11 that is based on the design of the entire network and a combination of optical transceiving units 12 and outputs an optical signal to an output port according to the instruction from the control unit 11. Optical signals with different wavelengths output from the reception-side optical switch unit 14 are sent to their corresponding optical transceiving units 12.

The demultiplexing unit 16 includes the function of demultiplexing a multiplexed input optical signal and outputting optical signals with different wavelengths. The demultiplexing unit 16 may be an arrayed waveguide grating, for example.

An operation to change operation modes of optical transceiving units 12 in the optical transmission device of this embodiment will now be described. It is assumed in the following description that the optical transmission device includes six optical transceiving units 12 as illustrated in FIG. 1. It is assumed that at present three of the optical transceiving units 12 are in the normal mode, two are in the fast activation mode, and one is in the power saving mode. A situation will be described where one of the three optical transceiving units 12 in the normal mode has shut down and one of the optical transceiving units 12 in the fast activation mode is caused to transition to the normal mode. The optical transceiving unit 12 that transitions from the normal mode to shutdown will be referred to as optical transceiving unit N1 and the optical transceiving unit 12 that is to be caused to be transition from the fast activation mode to the normal mode will be referred to as optical transceiving unit P1.

The control unit 11 sends an instruction to transition to the normal mode to optical transceiving unit P1. The control unit 11 also sends information indicating the wavelength of an optical signal used at optical transceiving unit P1 to the optical transceiving unit P1 together with the instruction. Optical transceiving unit P1 receives the instruction to transition to the normal mode from the control unit 11 and starts driving elements required for optical signal transmission/reception. Optical transceiving unit P1 sets a wavelength of an output from the semiconductor laser in accordance with the optical signal wavelength information received from the control unit 11. Upon completion of transition to the normal mode in which transmission and reception of the optical signal are possible, optical transceiving unit P1 sends information indicating the completion of the transition to the control unit 11. The control unit 11 controls the transmission-side optical switch unit 13 so that the optical signal from optical transceiving unit P1 is output through the output of the transmission-side optical switch unit 13 through which the optical signal from optical transceiving unit N1 has been being output. The control unit 11 also controls the reception-side optical switch unit 14 so that the optical signal that has been being transmitted to optical transceiving unit N1 is transmitted to optical transceiving unit P1. Upon completion of the switching of the optical path in response to the instruction from the control unit 11, the transmission-side optical switch unit 13 and the reception-side optical switch unit 14 send information indicating the completion of the path switching to the control unit 11. When the control unit 11 recognizes the completion of settings of optical transceiving unit P1, the transmission-side optical switch unit 13 and the reception-side optical switch unit 14, the control unit 11 switches optical signal transmission and reception performed at optical transceiving unit N1 to transmission and reception at optical transceiving unit P1.

Upon completion of transition of optical transceiving unit P1 to the normal mode, the control unit 11 issues an instruction to transition to the fast activation mode to an optical transceiving unit 12 in a power saving mode. The optical transceiving unit 12 in the power saving mode in this embodiment will be referred to as optical transceiving unit R1. Optical transceiving unit R1 receives the instruction to transition to the fast activation mode from the control unit 11 and places its elements in the settings in the fast activation mode. Upon completion of placing the elements in the settings in the fast activation mode, optical transceiving unit R1 sends information indicating that optical transceiving unit R1 has entered in the standby state in the fast activation mode to the control unit 11.

Optical transceiving unit N1, which has stopped optical signal transmission and reception, transitions to a set state such as the complete shutdown state or the standby state in a power saving mode, depending on the situation in accordance with the instruction from the control unit 11. In the event of abnormal shutdown, optical transceiving unit N1 may be on standby in the same state except that optical signal transmission and reception function is disabled.

As has been described above, when an alternative optical transceiving unit 12 needs to be used in the event of a failure or the like in an optical transceiving unit 12, the alternative optical transceiving unit is caused to transition from the fast activation mode to the normal mode to quickly enable optical signal transmission/reception. In addition, an optical transceiving unit 12 in a power saving mode can be caused to transition to the fast activation mode for future need for an additional alternative optical transceiving unit 12.

Since the optical transmission device of this embodiment includes backup optical transceiving units in a standby state in which some of their elements are active, switching from an optical transceiving unit that is being used in optical signal transmission/reception to a backup optical transceiving unit can be quickly made. In the event of a failure in an optical transceiving unit, quick switching can be made to reduce communication shutdown time to improve the reliability of the optical transmission device. Furthermore, since backup optical transceiving units in two standby modes are provided, the number of optical transceiving units in the standby mode that consumes more power can be reduced. Thus, in the optical transmission device according to this embodiment, both of improvement of the reliability and power saving can be achieved.

Figure 2:
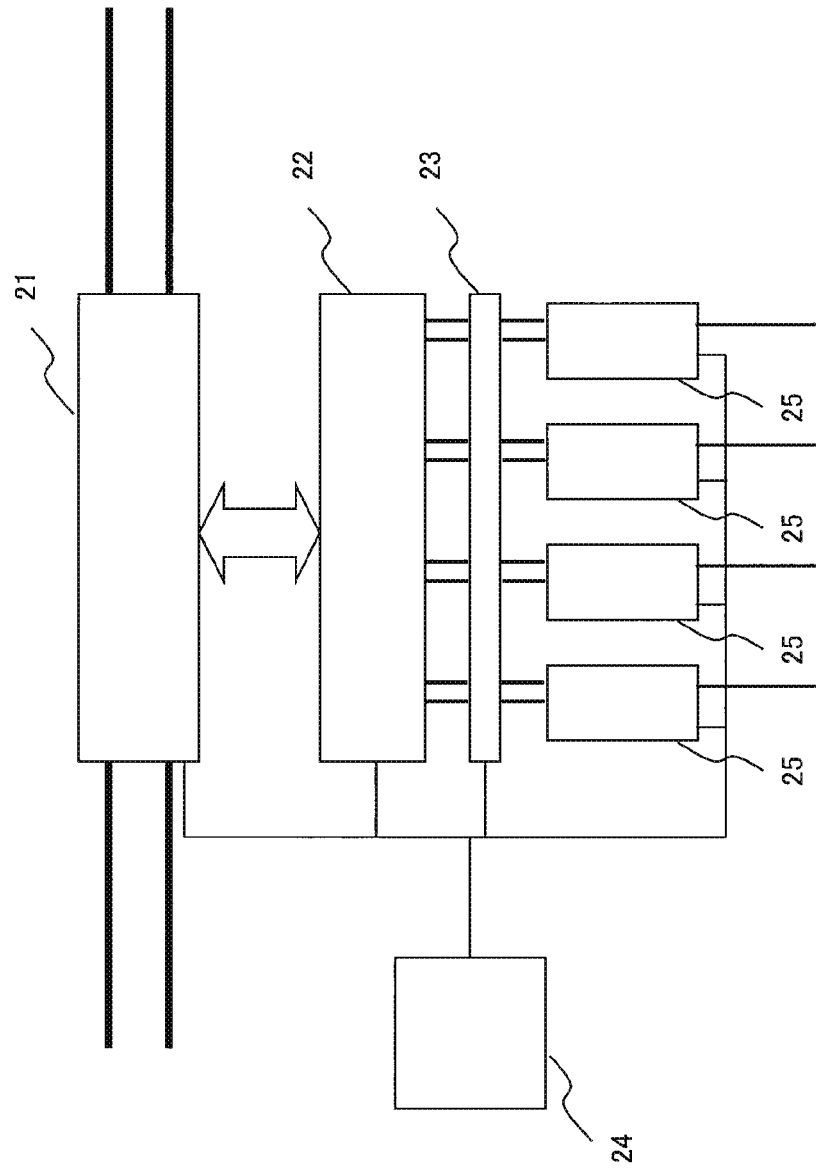
FIG. 2 is a diagram illustrating an overview of a configuration of a second embodiment of the present invention.

A second embodiment of the present invention will be described in detail with reference to FIG. 2. FIG. 2 illustrates an overview of a configuration of an optical transmission device of this embodiment. The optical transmission device of this embodiment includes an optical add/drop multiplexing unit 21, an optical switch unit 22, a signal monitor unit 23, a control unit 24 and optical transceiving units 25. Optical fibers of transmission paths are connected to the optical add/drop multiplexing unit 21.

The optical add/drop multiplexing unit 21 includes an optical cross-connect function. In the optical add/drop multiplexing unit 21, optical signals input from the transmission paths are demultiplexed, individually sent to predetermined paths, and then multiplexed and output to each transmission path. Some of the demultiplexed optical signals are dropped and input into the optical switch unit 22. Optical signals transmitted from the optical transceiving units 25 are input into the optical add/drop multiplexing unit 21 through the optical switch unit 22. The optical signals input into the optical add/drop multiplexing unit 21 are added to transmission paths as optical signals. In this embodiment, it is assumed that an ROADM (Reconfigurable Optical Add/drop Multiplexer) which can arbitrarily set optical signal paths from the transmission paths is used as the optical add/drop multiplexing unit 21. The optical add/drop multiplexing unit 21 may be other type of optical add/drop multiplexer where path switching is done by an operator or by reconfiguration of lines such as optical fibers, instead of the ROADM.

Figure 3:
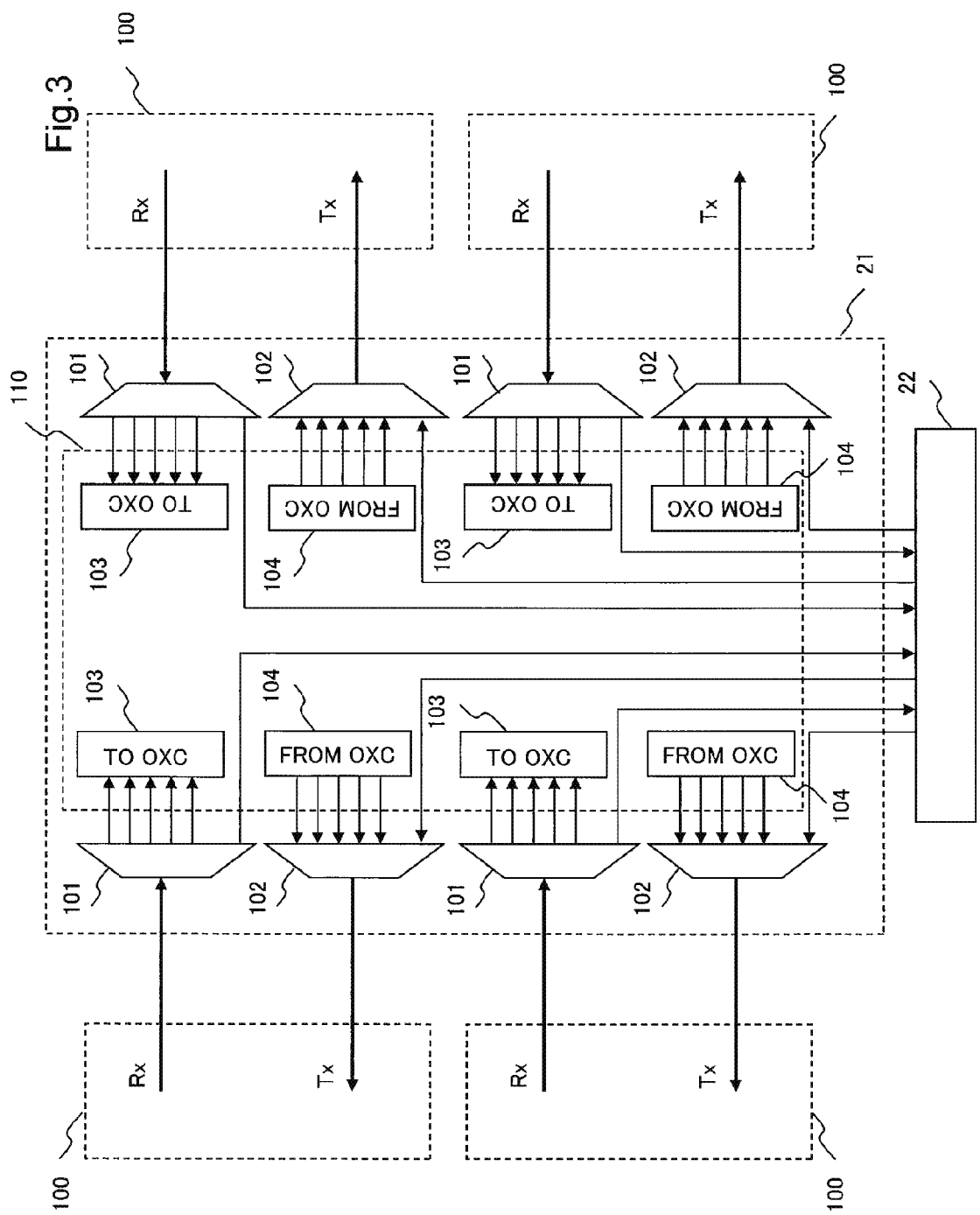
FIG. 3 is a diagram illustrating a part of the configuration of the second embodiment of the present invention.

FIG. 3 illustrates an overview of a configuration of the optical add/drop multiplexing unit 21 of this embodiment. Optical signals from a transmission path 100 are input into the optical add/drop multiplexing unit 21. The optical signals input in the optical add/drop multiplexing unit 21 are demultiplexed at a demultiplexing unit 101 into optical signals with different wavelengths. The demultiplexed optical signals with different wavelengths are separated into a signal group 103 directed to an optical cross-connect unit and an optical signal dropped and directed to the optical switch unit 22 and are sent. A signal group 104 from the optical cross-connect unit and an optical signal added from the optical switch unit 22 are multiplexed together at a multiplexing unit 102 and the resulting optical signal is output from the optical add/drop multiplexing unit 21 to a transmission path 100. While only one path is depicted as being dropped from each transmission path in the optical add/drop multiplexing unit 21 and only one optical signal path is depicted as being added to each transmission path in FIG. 3, a plurality of optical signals may be added to/dropped from each transmission path and as many paths as needed may be provided.

Figure 4:
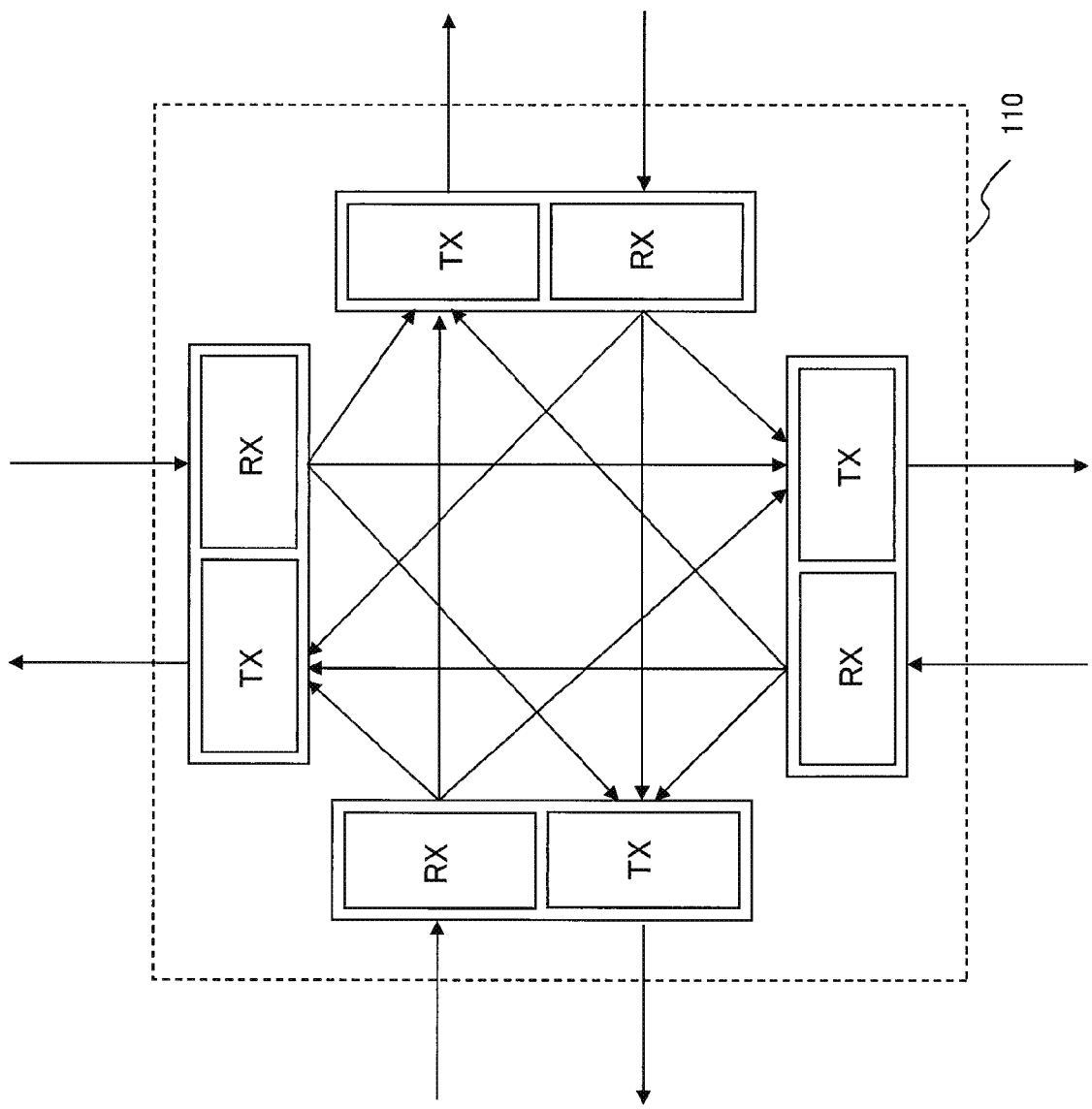
FIG. 4 is a diagram illustrating a part of the configuration of the second embodiment of the present invention.

The block of the signal groups 103 to the optical cross-connect unit and the block of the signal groups 104 from the optical cross-connect unit in FIG. 3 are equivalent to an optical cross-connect unit 110. FIG. 4 illustrates an overview of a configuration of the optical cross-connect unit 110. A functional section that multiplexes optical signals together and outputs the resulting optical signal to a transmission path is labeled Tx and a functional section that separates an optical signal input from a transmission path and sends the resulting optical signals to other transmission paths are labeled Rx in FIG. 4. A signal group 103 to the optical cross-connect unit in FIG. 3 is equivalent to a path from one Rx to Tx of other paths in FIG. 4. A signal group 104 from the optical cross-connect unit in FIG. 3 is equivalent to a path to one Tx from Rx of other paths in FIG. 4. In the optical cross-connect unit, an optical signal from each transmission path is demultiplexed and distributed to other transmission paths. Optical signals sent from other transmission paths are multiplexed and sent to a transmission path. Thus, an optical signal from each transmission path can be transmitted to any of the other transmission paths. The path of each optical signal is determined in accordance with the design of the entire network.

The optical switch unit 22 includes the function of converting optical signal paths into a matrix according to an instruction from the control unit 24. Specifically, the optical switch unit 22 includes the function of outputting an optical signal transmitted from an optical transceiving unit 25 to any of the paths. Additionally, the optical switch unit 22 is capable of outputting an optical signal from the optical add/drop multiplexing unit 21 to the path to any of the optical transceiving units 25. A combination of the configurations and functions of the transmission-side optical switch unit and the reception-side optical switch unit of the first embodiment may be used as the optical switch unit 22.

The signal monitor unit 23 includes the function of monitoring optical signals transmitted and received between the optical switch unit 22 and each optical transceiving unit 25. In the signal monitor unit 23, some of the optical signals of the paths are dropped and a photodiode detects optical signals. The signal monitor unit 23 measures the intensities of optical signals, measures the amount of traffic based on whether or not optical signals are detected, monitors optical signals for abnormalities, and sends the results to the control unit 24.

The control unit 24 includes the function of controlling the entire optical transmission device. The control unit 24 controls the optical switch unit 22 to establish paths of optical signals, controls the optical transceiving units 25 to transmit and receive optical signals, sets wavelengths of optical signals to be transmitted and received and performs other control. The control unit 24 includes the function of monitoring the status of transmission and reception of optical signals on the basis of the results of monitoring sent from the signal monitor unit 23. The control unit 24 also includes the function of controlling settings of activation of the optical transceiving units 25. The control unit 24 further includes the functions of controlling optical signal paths and monitoring communication status in the optical add/drop multiplexing unit 21.

Figure 5:
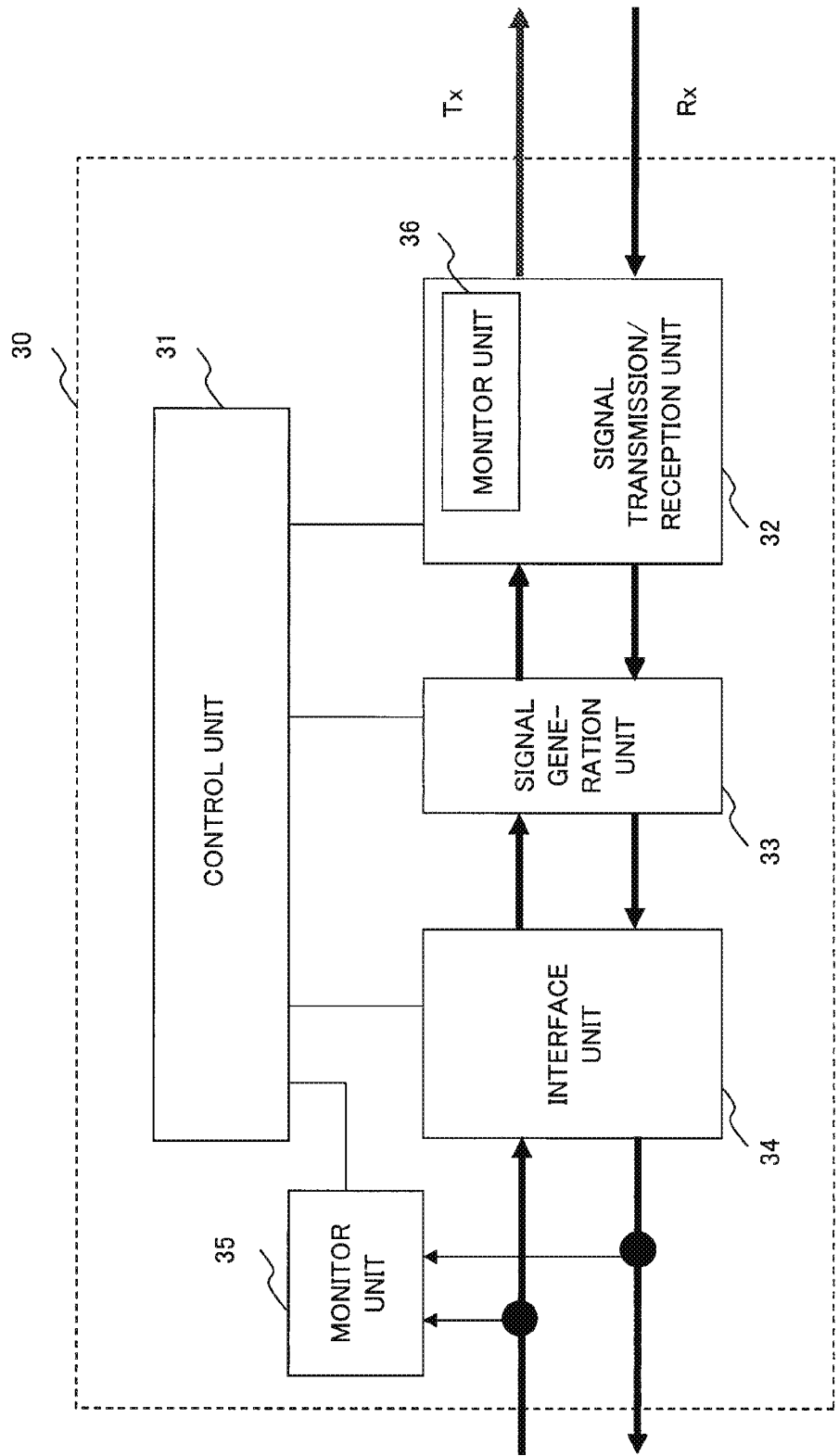
FIG. 5 is a diagram illustrating a part of the configuration of the second embodiment of the present invention.

Each of the optical transceiving units 25 includes the function of transmitting and receiving optical signals. A configuration and functions of an optical transceiving unit 25 will be described in detail with reference to FIG. 5. FIG. 5 illustrates a block diagram of a configuration of the optical transceiving unit 25 as an optical transceiving unit 30. As illustrated in FIG. 5, the optical transceiving unit 30 includes an optical transmission/reception control unit 31, a signal transmission/reception unit 32, a signal generation unit 33, and an interface unit 34. The optical transceiving unit 30 also includes a signal monitor units 35 and 36. The optical transmission/reception control unit 31 includes the function of performing general control of the optical transceiving unit 30 on the basis of instructions from the control unit 24 that controls the entire optical transmission device. The signal transmission/reception unit 32 includes a semiconductor laser for transmitting optical signals and a photodiode for receiving optical signals. The signal transmission/reception unit 32 converts an electrical signal to an optical signal with the semiconductor laser and transmits the optical signal, and converts a received optical signal to an electrical signal with the photodiode. The signal generation unit 33 converts a signal input from the interface unit 34 to a signal for transmission, and converts a received signal for transmission to a signal to be output to the interface unit 34. The interface unit 34 performs transmission and reception of signals to and from terminal devices and other communication devices. The monitor unit 35 monitors signals input and output at the interface unit 34. The monitor unit 36 monitors signals input and output at the signal transmission/reception unit 32. The monitor function measures the amount of traffic of optical signals transmitted and received at the optical transceiving unit 30 and monitors for failures. The optical transceiving unit 30 also includes the function of setting three modes: a normal mode, a fast activation mode and a power saving mode as in the first embodiment.

Figure 6:
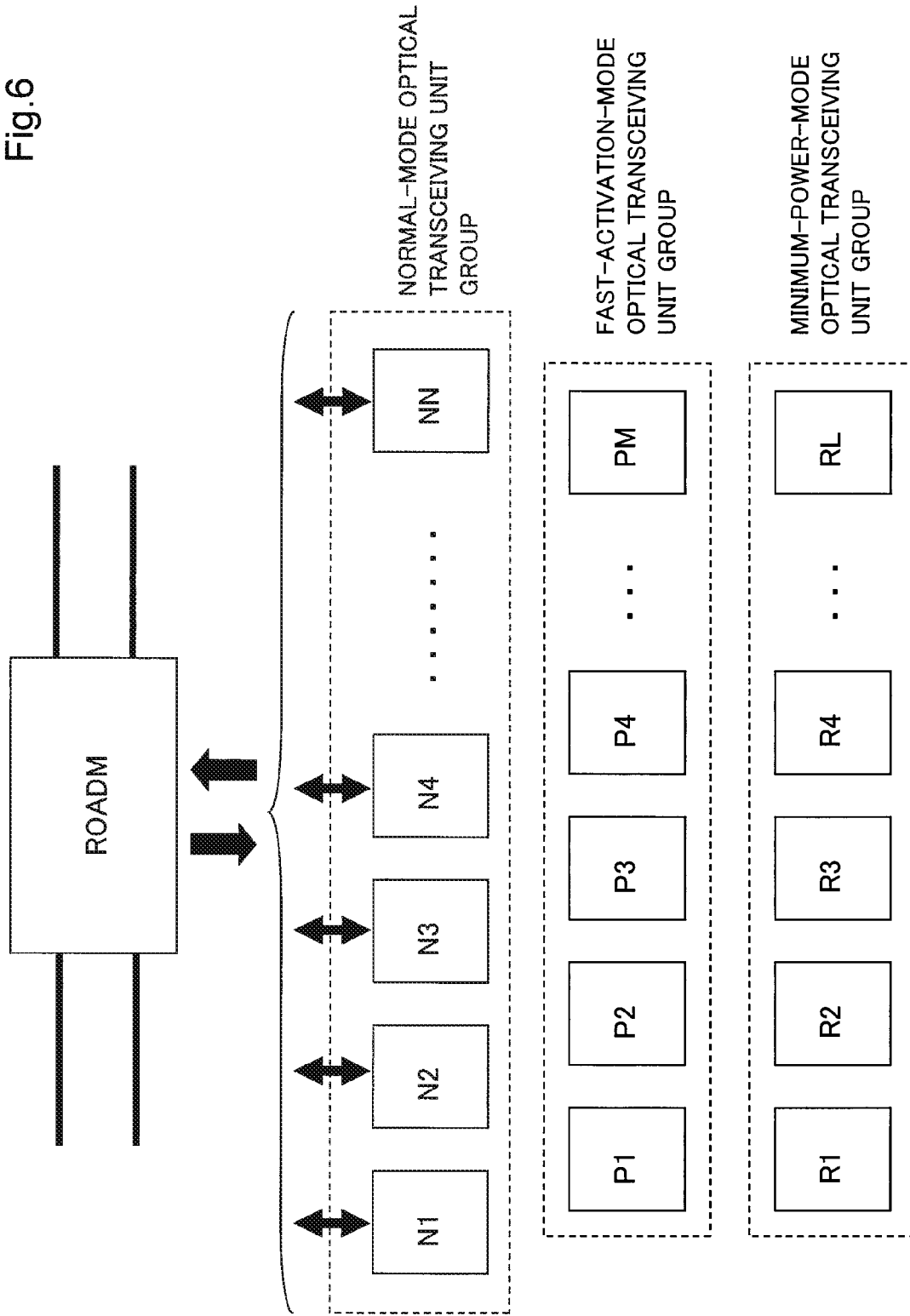
FIG. 6 is a diagram illustrating an exemplary configuration in the second embodiment of the present invention.

An operation performed in the optical transmission device of this embodiment when a failure has occurred in an optical transceiving unit will be described. FIG. 6 schematically illustrates a configuration of optical transceiving units in the different operation modes at normal time in this embodiment. FIG. 6 illustrates groups of optical transceiving units in a normal mode, a fast activation mode, and a minimum power mode, and an ROADM, which is an optical add/drop multiplexing unit performing optical signal transmission to/reception from optical transceiving units in the normal mode. The control unit, the optical switch unit and the signal monitor units are omitted from FIG. 6.

It is assumed here that N optical transceiving units in the normal mode, M optical transceiving units in the fast activation mode, and L optical transceiving units in the minimum power mode are provided. In the normal mode, optical signals can be transmitted and received all the time. Optical transceiving units in the normal mode are labeled N and it is assumed that N optical transceiving units N1 to NN are provided. The fast activation mode is a standby state in which the optical transceiving unit can transition to the normal mode in a short time in response to an instruction from the control unit. The optical transceiving units in the fast activation mode are labeled P and it is assumed that M optical transceiving units P1 to PM are provided. The minimum power mode is a standby state in which optical transceiving units transition to the normal mode in response to an instruction from the control unit in a longer time than in the fast activation mode but consume minimum power. The optical transceiving units in the minimum power mode are labeled R and it is assumed that L optical transceiving units R1 to RL are provided. The optical transceiving units in this embodiment are of wavelength-tunable type. Accordingly, the wavelength set at an optical transceiving unit that transitions from the fast activation mode to the normal mode is tunable to a set wavelength used at a normal-mode optical transceiving unit to replace. Therefore, there is no need to provide as many optical transmission devices in the fast activation mode as the number of optical transmission devices in the normal mode. This embodiment is configured so that fewer optical transceiving units are in the fast activation mode than optical transmission devices in the normal mode, i.e. the number N of optical transmission devices in the normal mode>the number M of optical transmission devices in the fast activation mode. A predetermined number of optical transceiving units that satisfies N>M are placed in the fast activation mode and more optical transceiving units on standby in the minimum power mode are provided so that the power consumption in the entire optical transmission device can be reduced.

Figure 7:
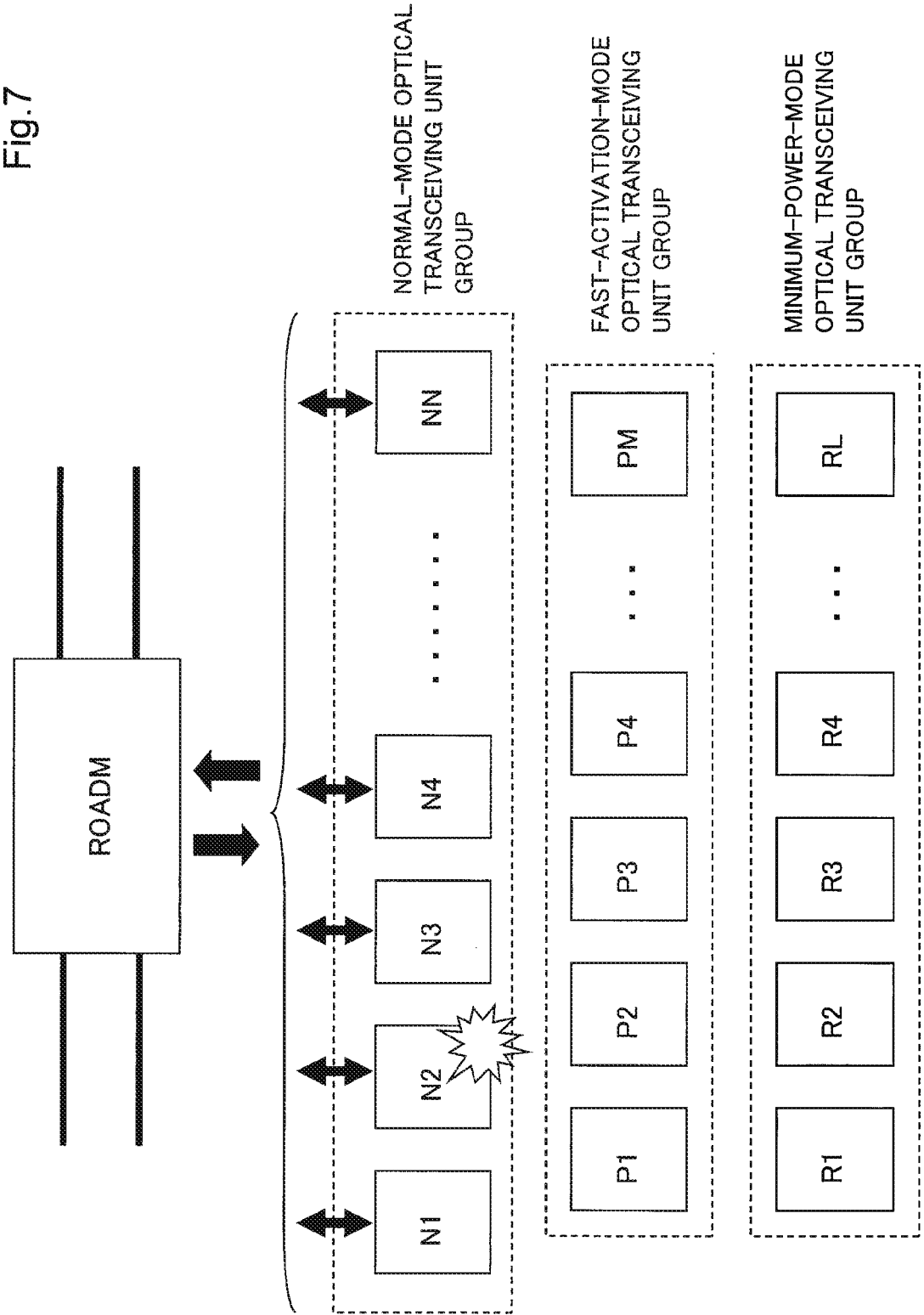
FIG. 7 is a diagram illustrating an exemplary configuration in the second embodiment of the present invention.

Assume that, as illustrated in FIG. 7, a failure has occurred in N2 among the optical transceiving units that are operating in the normal mode. When the control unit detects the abnormality in the optical transceiving unit N2 in the normal mode, the control unit sends an instruction to transition to the normal mode to an optical transceiving unit on standby in the fast activation mode. An abnormality is detected when, for example, the signal monitor unit 23 in FIG. 2 cannot detect an optical signal. It is assumed that the control unit sends an instruction to transition to the normal mode to P1 among the optical transceiving units in the fast activation mode along with information such as an optical signal wavelength to be used. Upon reception of the instruction to transition to the normal mode, optical transceiving unit P1 transitions to the normal mode with a setting based on the instruction from the control unit. Optical transceiving unit P1, which has transitioned to the normal mode, sends information indicating that the transition to the normal mode has been completed to the control unit. The control unit realizes the transition of optical transceiving unit P1 to the normal mode and sends a path switching instruction to the optical switch unit. Upon reception of the path switching instruction from the control unit, the optical switch unit makes path switching so that an optical signal that has been being transmitted to optical transceiving unit N1 is transmitted to P1. In addition, the optical switch unit makes path switching so that an optical signal sent from optical transceiving unit P1 is output to the path to which an optical signal sent from the optical transceiving unit N1 has been being output. Upon completion of the path switching, the optical switch unit sends a signal indicating the completion of the path switching to the control unit. Upon reception of the indication of the completion of the path switching from the optical switch unit, the control unit controls optical transceiving unit P1 so as to transmit/receive the optical signal that was being transmitted/received by N1. After the completion of switching to P1, the control unit issues an instruction to optical transceiving unit N1 to stop power supply to elements of N1 and the N1 enters the standby state.

Figure 8:
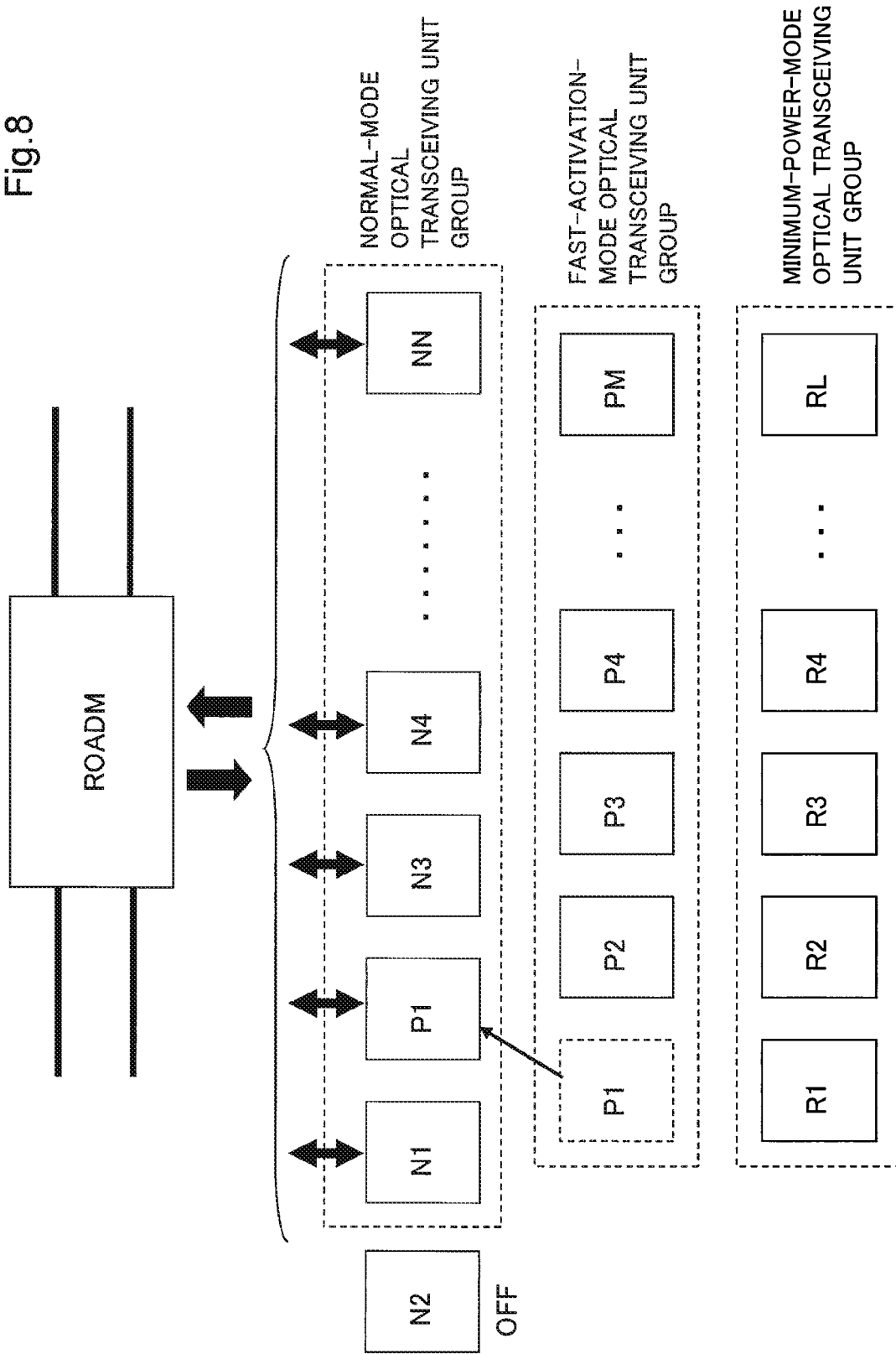
FIG. 8 is a diagram illustrating an exemplary configuration in the second embodiment of the present invention.
Figure 9:
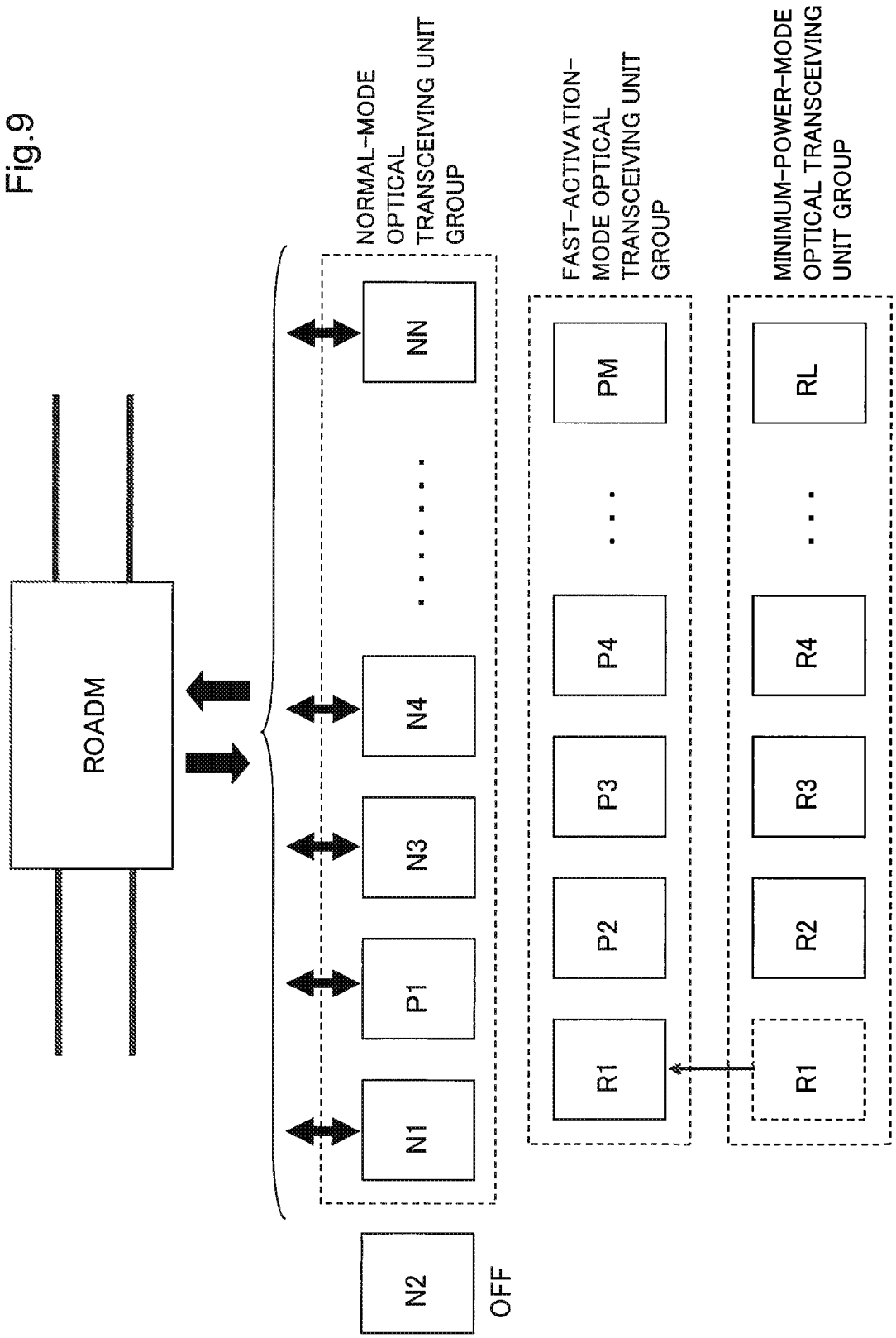
FIG. 9 is a diagram illustrating an exemplary configuration in the second embodiment of the present invention.

FIG. 8 schematically illustrates the optical transceiving units in different settings after optical transceiving unit P1 has transitioned to the normal mode and N2 has shut down. When the control unit starts to use optical transceiving unit P1 in the normal mode, the control unit causes an optical transceiving unit in the minimum power mode to transition to the fast activation mode in order to make up for the decrease of the number of optical transceiving units in the fast activation mode. It is assumed here that the optical transceiving unit that is caused to transition to the minimum power mode is R1. Upon reception of the instruction to transition to the fast activation mode from the control unit, optical transceiving unit R1 switches the elements making up optical transceiving unit R1 in the fast activation mode to fast-activation-mode settings. Upon completion of the transition to the fast activation mode, optical transceiving unit R1 sends information indicating the completion of the transition to the control unit. When the control unit receives the information indicating the completion of the transition to the fast activation mode from optical transceiving unit R1, the control unit completes the operation for activation state transition. FIG. 9 schematically illustrates the optical transceiving units in the different operation modes after optical transceiving unit R1 has transitioned to the fast activation mode.

Figure 10:
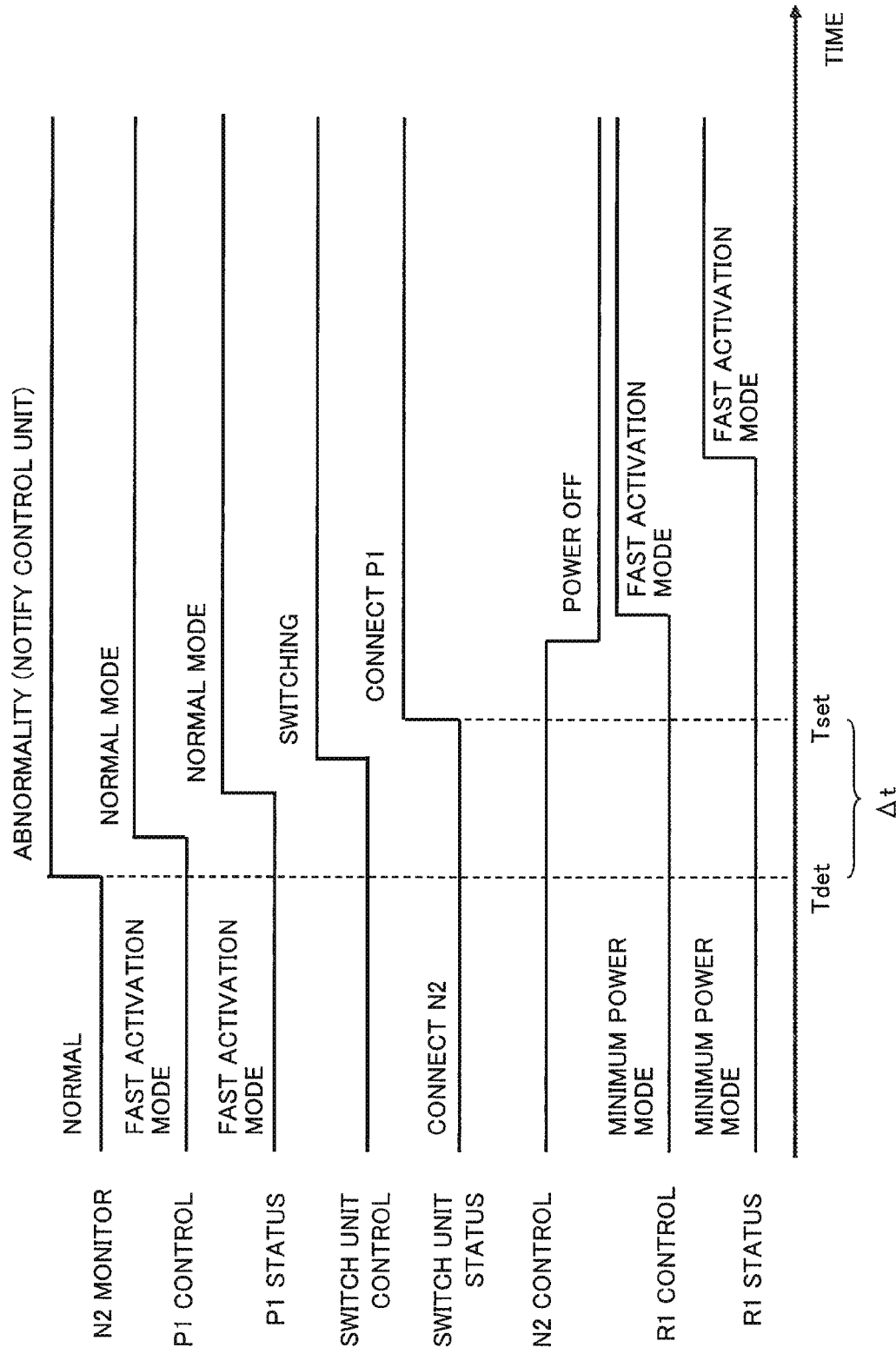
FIG. 10 is a diagram illustrating an exemplary configuration in the second embodiment of the present invention.

FIG. 10 illustrates operations of optical transceiving units over time when the units changes operation modes in the event of a failure. The changes in the vertical direction in FIG. 10 represents that there were some changes in the status. Assume that an abnormality in optical transceiving unit N2 is detected at time Tdet. When the control unit detects the abnormality, the control unit controls optical transceiving unit P1 to cause the setting at P1 to transition to the normal mode. Upon transition of optical transceiving unit P1 to the normal mode, the optical switch unit is controlled so that optical transceiving unit P1 is connected in place of N2. At this point in time, Tset, optical signal transmission/reception is resumed and Tset-Tdet is the time Δt required for the failure recovery. Although allowable time Δt between the detection of abnormality in an optical transceiving unit N1 and the resumption of optical signal transmission/reception at alternative optical transceiving unit P1 varies depending on the design of the network and other factors, the time Δt needs to be short, for example, 50 msec or less. Since the optical transceiving unit that transitions from the minimum power mode is not immediately used for optical signal transmission/reception in this embodiment, a period of several seconds or more may be allowable as the time taken to transition from the minimum power mode to the fast activation mode.

Figure 11:
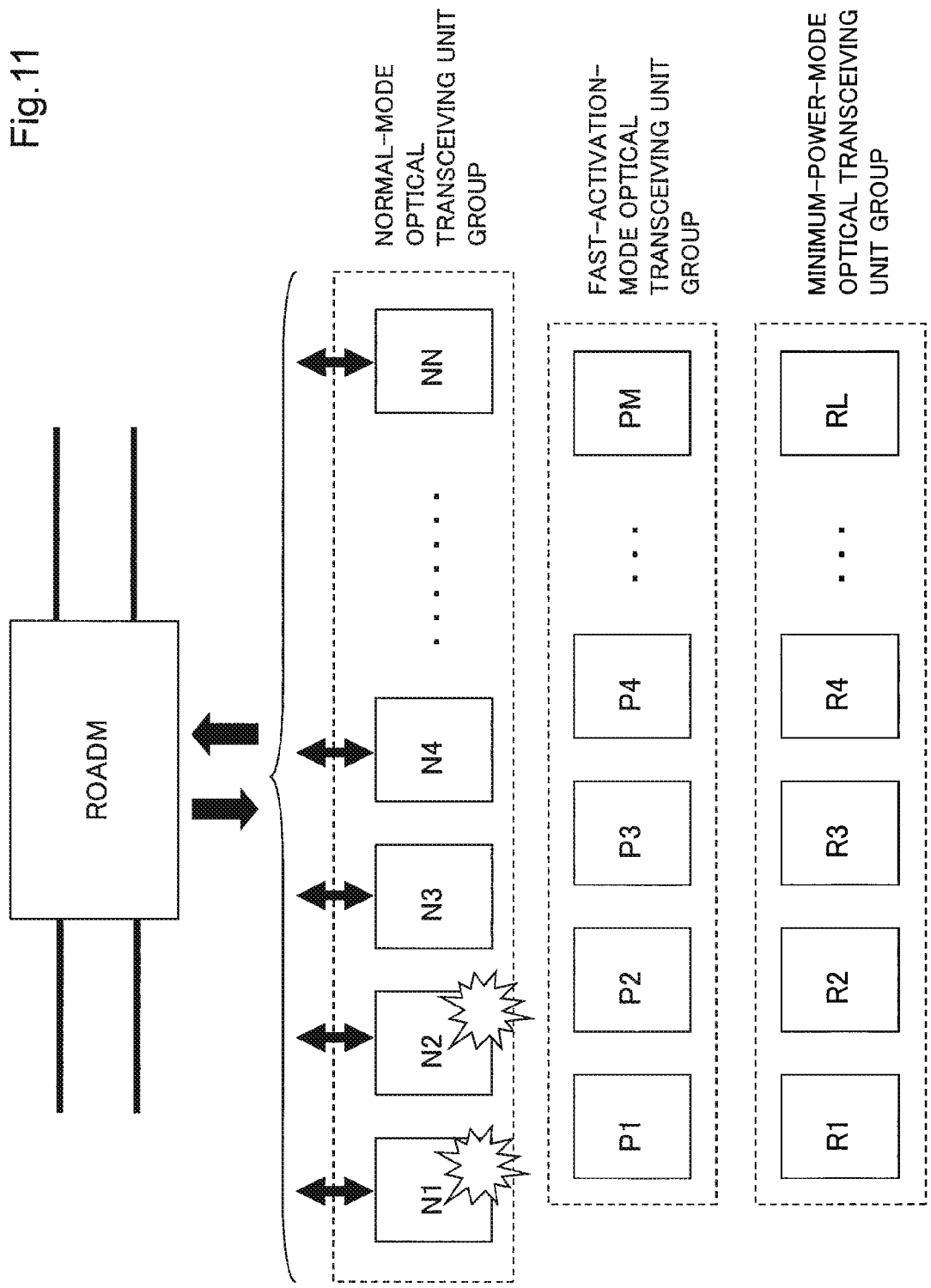
FIG. 11 is a diagram illustrating an exemplary operation in the second embodiment of the present invention.
Figure 12:
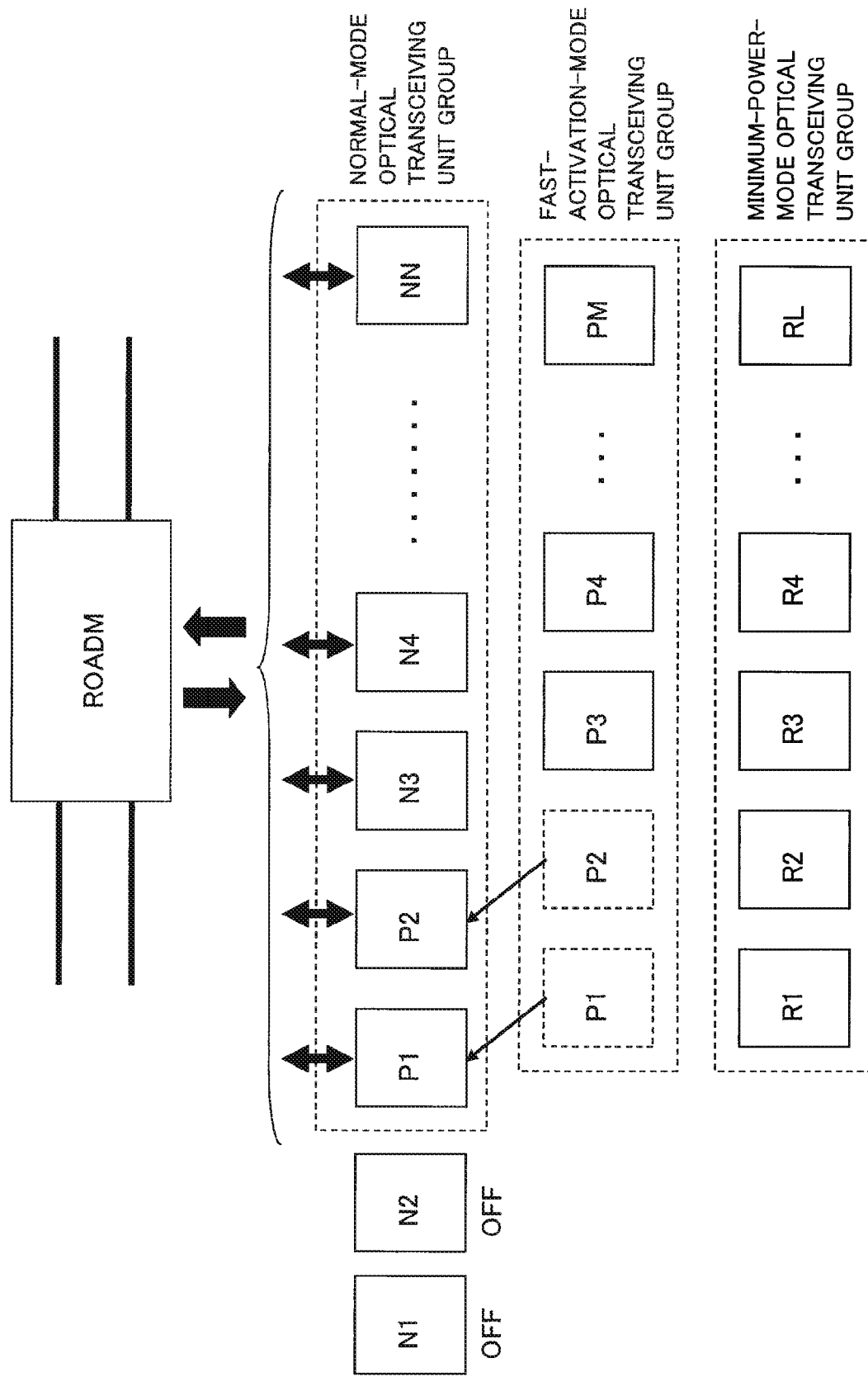
FIG. 12 is a diagram illustrating an exemplary configuration in the second embodiment of the present invention.
Figure 13:
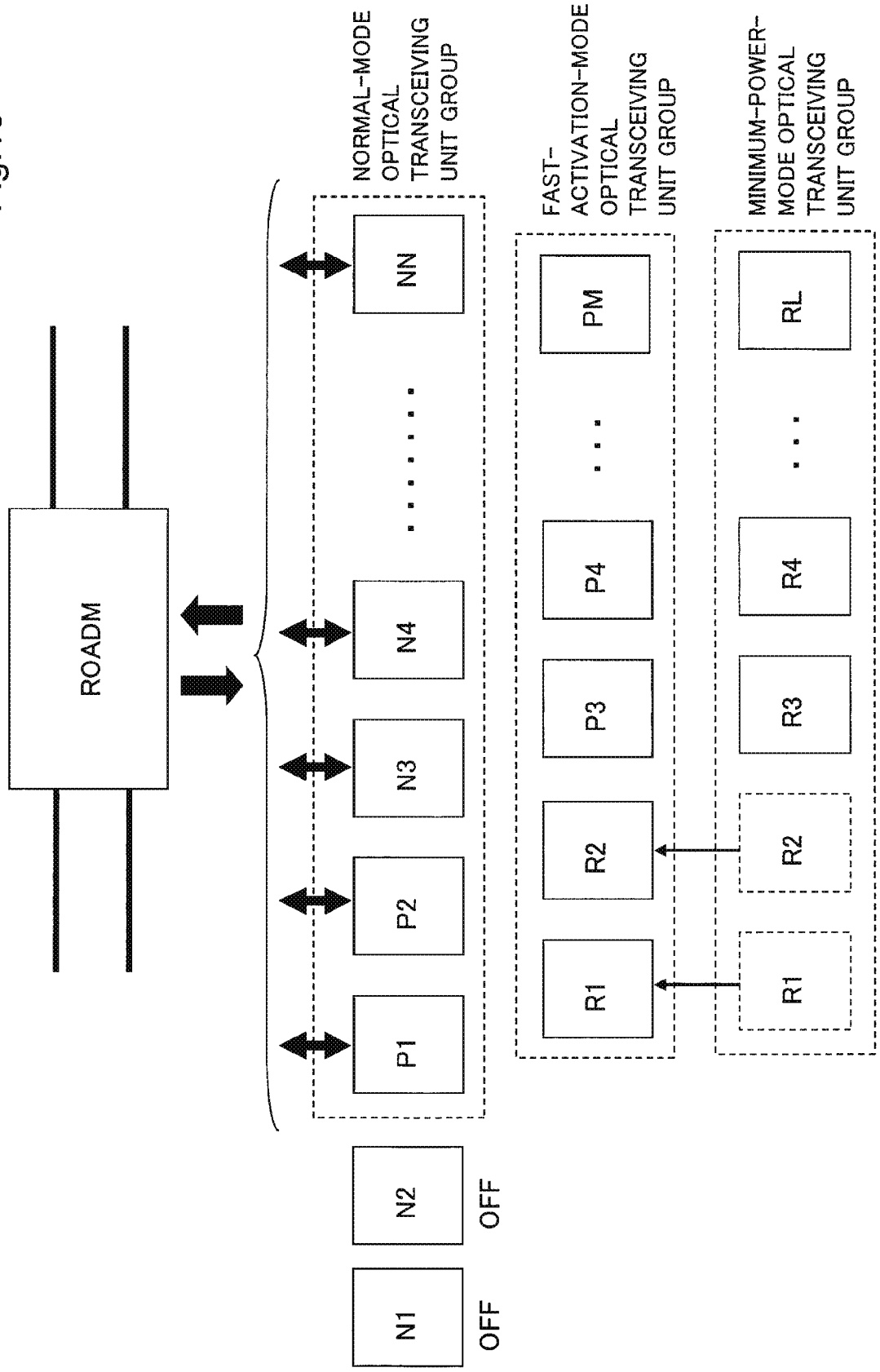
FIG. 13 is a diagram illustrating an exemplary configuration in the second embodiment of the present invention.

While switching performed when only one of the normal-mode optical transceiving units has failed has been described with respect to this embodiment, switching similar to the switching described above is performed for optical transceiving units when abnormalities occur in a plurality of optical transceiving units. For example, assume that failures have occurred in two optical transceiving units N1 and N2 in the normal mode as illustrated in FIG. 11. Since the two optical transceiving units used in optical signal transmission/reception in the normal mode have failed, two optical transceiving units in the fast activation mode transition to the normal mode and the optical signal transmission/reception is resumed. FIG. 12 illustrates a state where optical transceiving units P1 and P2 have transitioned from the fast activation mode to the normal mode and failed N1 and N2 have shut down. Since the number of the optical transceiving units in the fast activation mode have decreased by two, two optical transceiving units transition from the minimum power mode to the fast activation mode and are put on standby in the fast activation mode in case of additional failures. FIG. 13 illustrates a state where optical transceiving units R1 and R2 have transitioned to the fast activation mode and the transition for failure recovery has been completed.

As has been described above, when one or more optical transceiving units in the normal mode have failed, switching from the fast activation mode to the normal mode is made to allow optical signal transmission/reception to be resumed. Furthermore, transition from the minimum power mode to the fast activation mode is made to make up for the decrease in the number of optical transceiving units in the fast activation mode, thereby allowing quick resumption of optical signal transmission/reception in the event of another failure. The two-stage transitions can reduce the number of optical transceiving units on standby in the fast activation mode to reduce the power consumption. Thus, since backup optical transceiving units that can be quickly activated are in the standby state in the optical transmission device of this embodiment, both of improvement of the reliability and power saving can be achieved.

Figure 14:
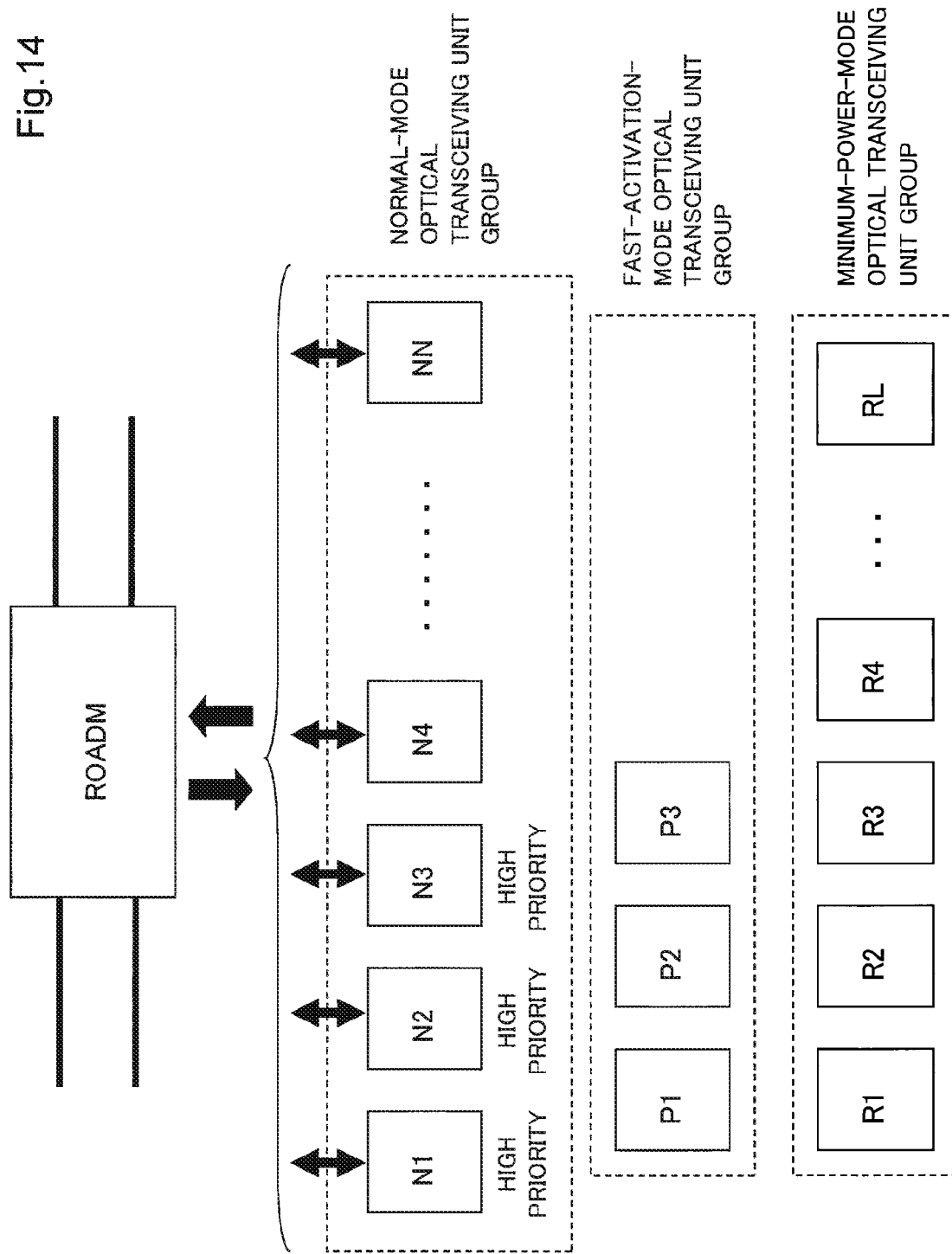
FIG. 14 is a diagram illustrating an overview of a configuration of a third embodiment of the present invention.

A third embodiment of the present invention will be described with reference to FIG. 14. FIG. 14 schematically illustrates a configuration of an optical transmission device according to the third embodiment in which optical transceiving units are classified by operation mode. In the second embodiment, when failures occur in optical transceiving units in the normal mode, as many optical transceiving units in the fast activation mode as the failed optical transceiving units in the normal mode are caused to transition to the normal mode and used as alternative optical transceiving units. In the third embodiment, determination is made as to whether or not to make transition from the fast activation mode to the normal mode on the basis of the priorities of optical transceiving units.

The configuration and functions of the optical transmission device of this embodiment are similar to those of the second embodiment. Priorities are given to optical transceiving units of this embodiment according to a predetermined criterion. The optical transceiving units in this embodiment are classified into two: high-priority and low-priority optical transceiving units. The predetermined criterion may be for example such that a high priority is given to optical transceiving units at which the amount of optical signal traffic is greater than or equal to ½ of the capacity of traffic and a low priority is given to the other optical transceiving units. It is assumed in this embodiment that a high priority is given to three optical transceiving units N1, N2 and N3 in the normal mode as illustrated in FIG. 14; N-3 optical transceiving units N4 to NN are low-priority optical transceiving units in the normal mode. It is assumed that at the current time, three optical transceiving units P1, P2 and P3 are in the fast activation mode.

Only three optical transceiving units in the fast activation mode are given a high priority because quick transition is needed only when a failure occurs in a high-priority optical transceiving unit. The number of optical transceiving units put on standby in the fast activation mode is determined according to the number of the high-priority optical transceiving units and the degree of importance of the optical network system. For example, if three optical transceiving units in the normal mode are given a high priority, two optical transceiving units may be in the fast activation mode. Optical transceiving units that are not used in optical signal transmission/reception in the normal mode and are not placed in the fast activation mode are on standby in the minimum power mode. In this embodiment, L optical transceiving units R1 to RL are in the minimum power mode.

Figure 15:
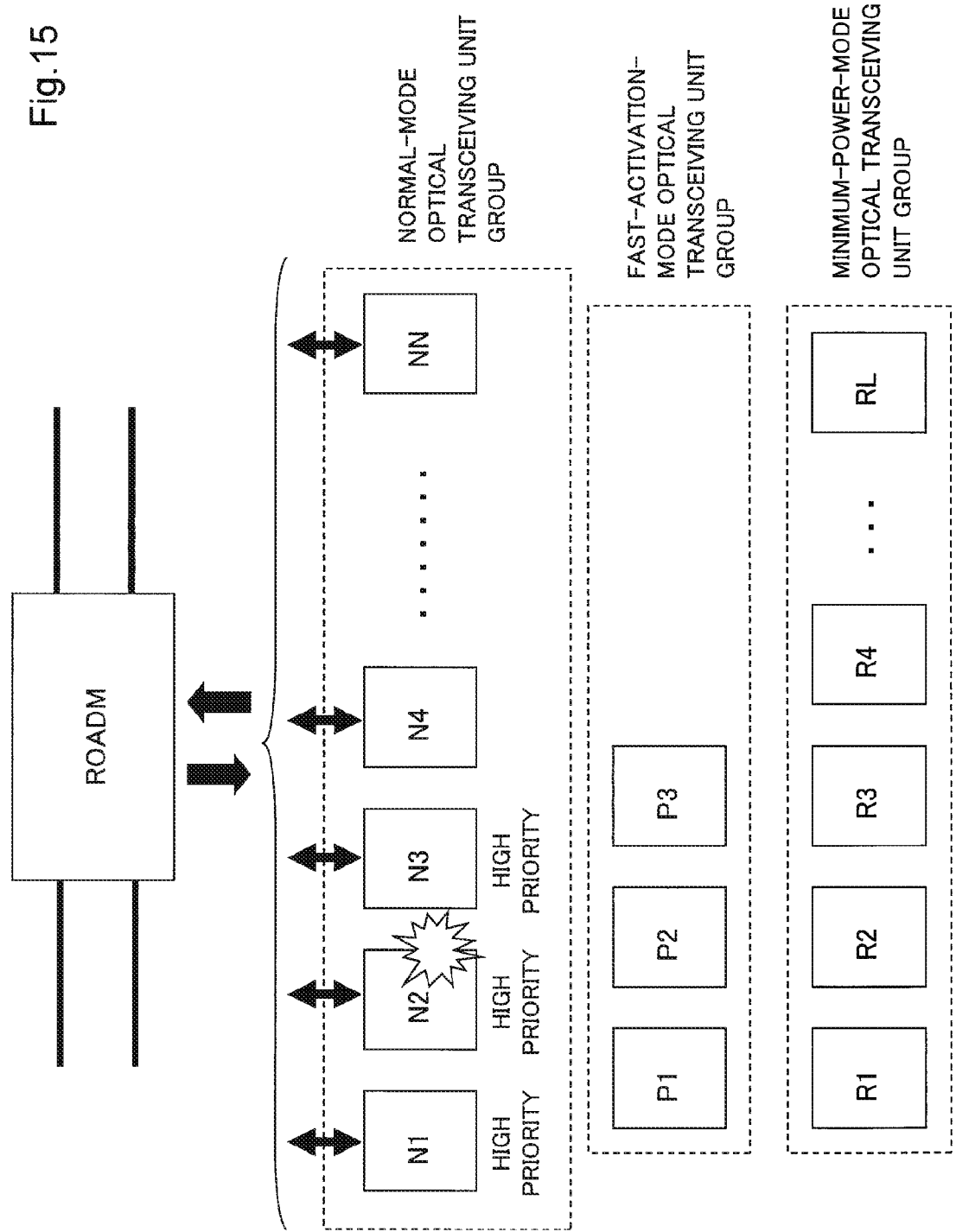
FIG. 15 is a diagram illustrating an exemplary configuration of the third embodiment of the present invention.

An operation will be described in this embodiment that is performed when a failure occurs in an optical transceiving unit in the normal mode, an optical transceiving unit in the fast activation mode transitions to the normal mode, and an optical transceiving unit being used for optical signal transmission/reception is switched. It is assumed that a failure has occurred in high-priority optical transceiving unit N2 used in the normal mode as illustrated in FIG. 15.

Figure 16:
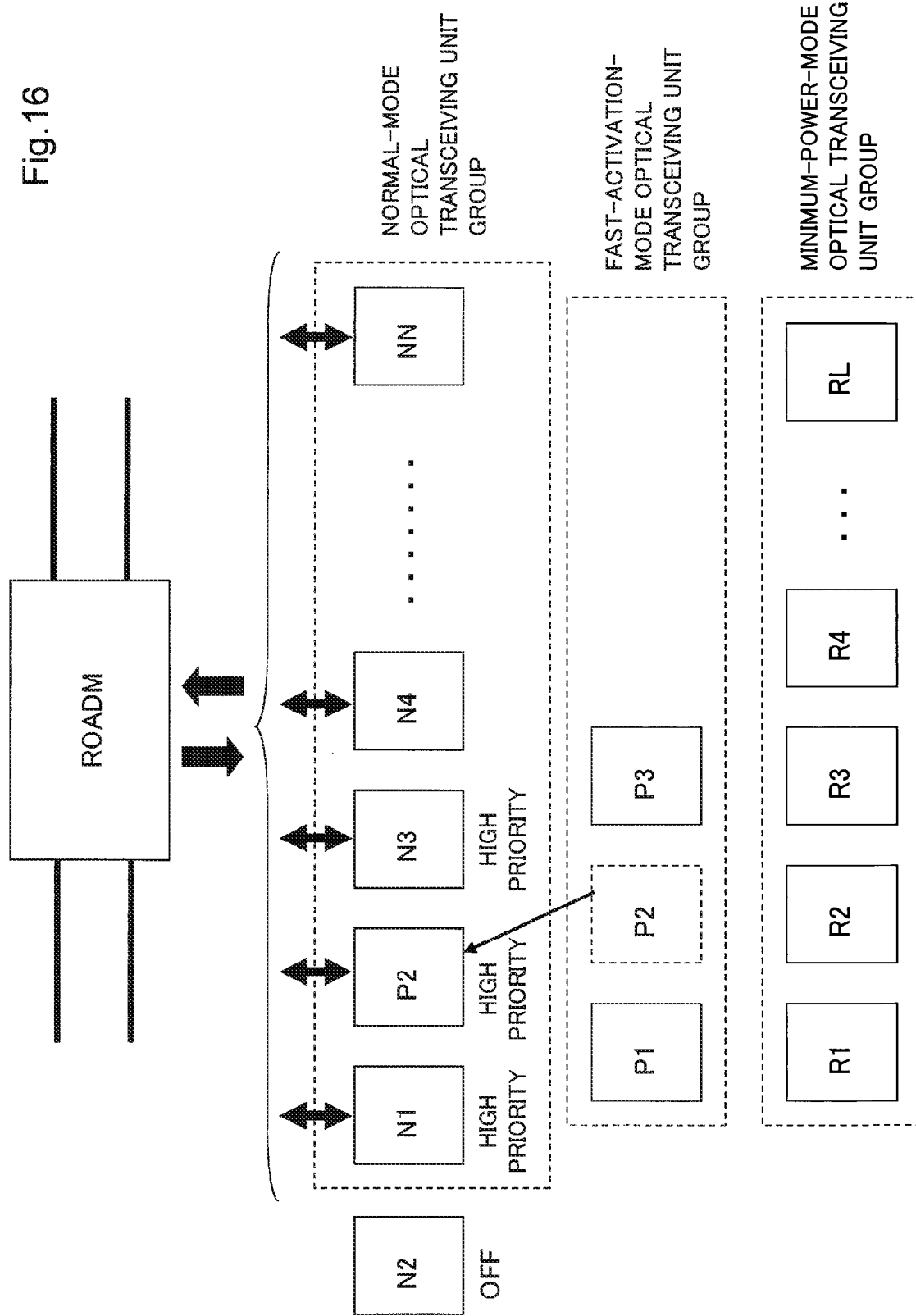
FIG. 16 is a diagram illustrating an exemplary configuration of the third embodiment of the present invention.

Upon detection of a failure in optical transceiving unit N2, the control unit determines whether or not the failed optical transceiving unit is of high priority or low priority. Since the failed optical transceiving unit N2 is of high priority, the control unit issues an instruction to transition to the normal mode to an optical transceiving unit on standby in the fast activation mode. It is assumed that the instruction to transition to the normal mode is issued to optical transceiving unit P2 in this embodiment. Optical transceiving unit P2 receives the instruction to transition to the normal mode and transitions to the normal mode setting. Upon completion of the transition, optical transceiving unit P2 provides information indicating the completion to the control unit. Upon reception of the information indicating the completion of the transition to the normal mode, the control unit issues an optical signal path switching instruction to the optical switch unit. Upon reception of the optical signal path switching instruction from the control unit, the optical switch unit performs path switching so as to allow optical transceiving unit P2 that has transitioned to the normal mode to perform optical signal transmission/reception performed by failed optical transceiving unit N2. Upon completion of the path switching, the optical switch unit notifies the control unit of the completion of the transition. Upon reception of the information indicating the completion of the path switching by the optical switch unit, the control unit performs optical signal transmission/reception at optical transceiving unit P2 that has transitioned to the normal mode. FIG. 16 illustrates a state where optical transceiving unit P2 has transitioned to the normal mode and N2 has shut down.

Figure 17:
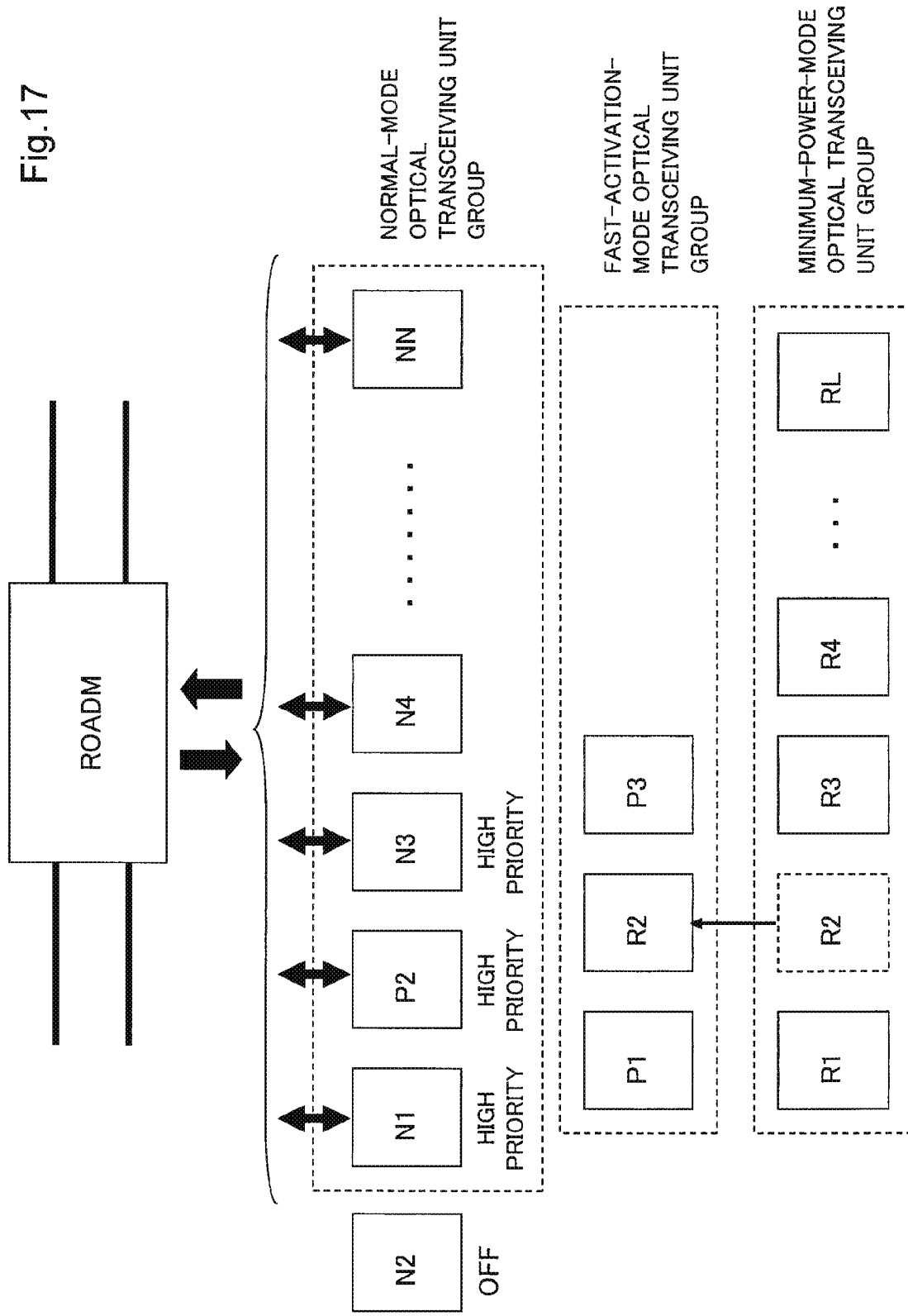
FIG. 17 is a diagram illustrating an exemplary configuration of the third embodiment of the present invention.

When the transition from the fast activation mode to the normal mode has been completed, the control unit issues an instruction to transition to the fast activation mode to optical transceiving units on standby in the minimum power mode. As many optical transceiving units as the optical transceiving units that have transitioned from the fast activation mode to the normal mode are caused to transition to the fast activation mode. Since only one optical transceiving unit has failed, optical transceiving unit R2 in the minimum power mode is caused to transition to the fast activation mode. Optical transceiving unit R2, which has received an instruction to transition to the fast activation mode from the control unit, changes its standby state setting to the fast-activation-mode setting. Upon completion of the transition from the minimum power mode to the fast activation mode, optical transceiving unit R2 sends information indicating the completion of the transition to the control unit. With the reception of the information indicating the completion of the transition from optical transceiving unit R2 which has transitioned from the minimum power mode to the fast activation mode, the control unit completes the transition operation for failure recovery. The control unit performs procedures such as powering off failed optical transceiving unit N2 as needed. FIG. 17 illustrates an example in which optical transceiving unit R2 has transitioned to the fast activation mode, N2 has been shut down, and the transition has been completed.

Figure 18:
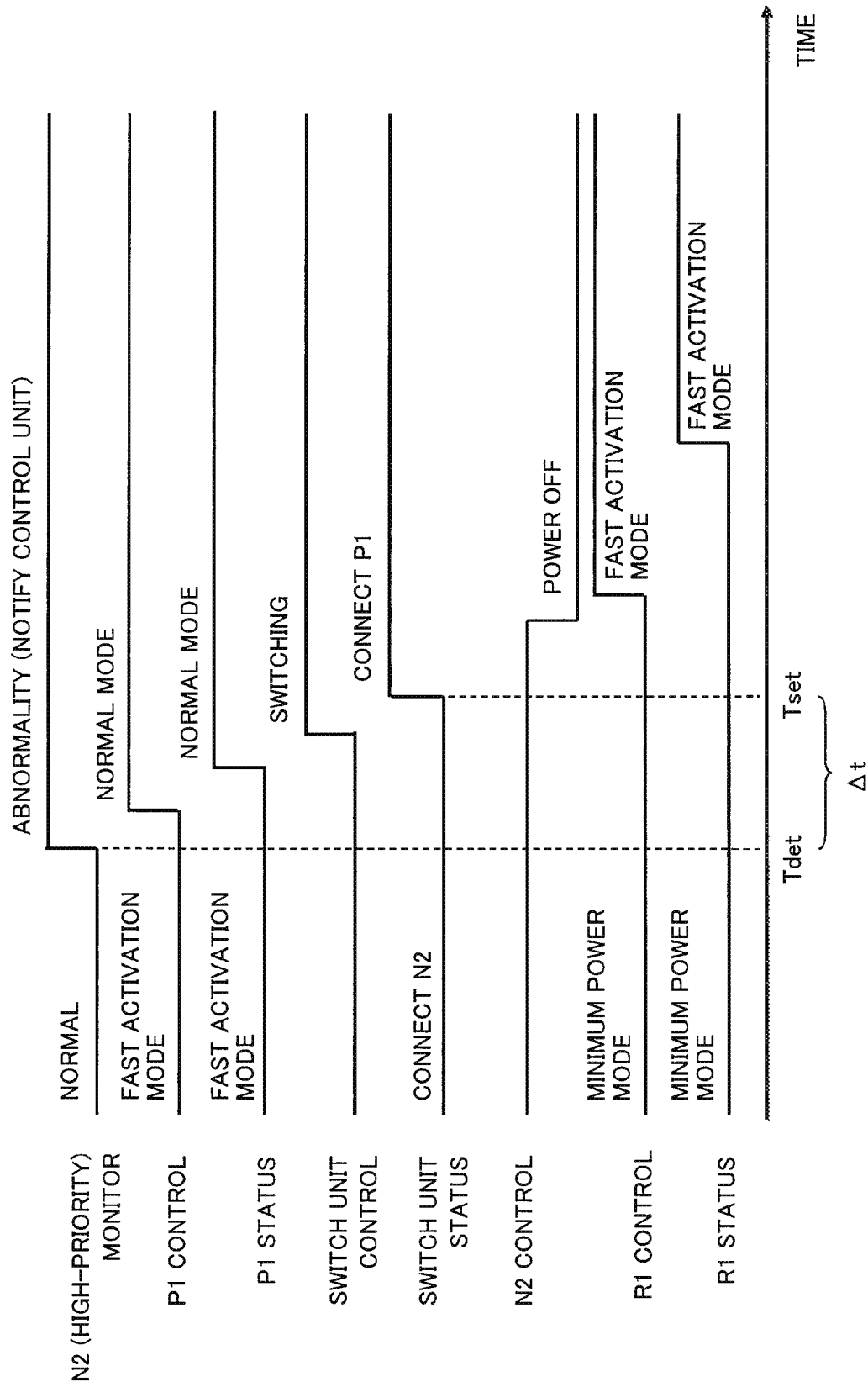
FIG. 18 is a diagram illustrating an exemplary operation of the third embodiment of the present invention.

FIG. 18 illustrates operations of optical transceiving units over time when the units changes operation modes in the event of a failure. The changes in the vertical direction in FIG. 18 represents that there were some changes in the status. Assume that an abnormality in optical transceiving unit N2 is detected at time Tdet. When the control unit detects the abnormality, the control unit controls optical transceiving unit P1 to cause the setting at P1 to transition to the normal mode. Upon transition of optical transceiving unit P1 to the normal mode, the switch unit is controlled so that optical transceiving unit P1 is connected in place of N2. At this point in time, Tset, optical signal transmission/reception is resumed and Tset-Tdet is the time Δt required for the failure recovery. Optical transceiving unit N2 transitions to the shutdown state as needed. The control unit issues an instruction to transition to the fast activation mode to optical transceiving unit R1 in the minimum power mode. Upon reception of the instruction to transition to the fast activation mode, optical transceiving unit R1 transitions to the fast-activation mode setting.

Figure 19:
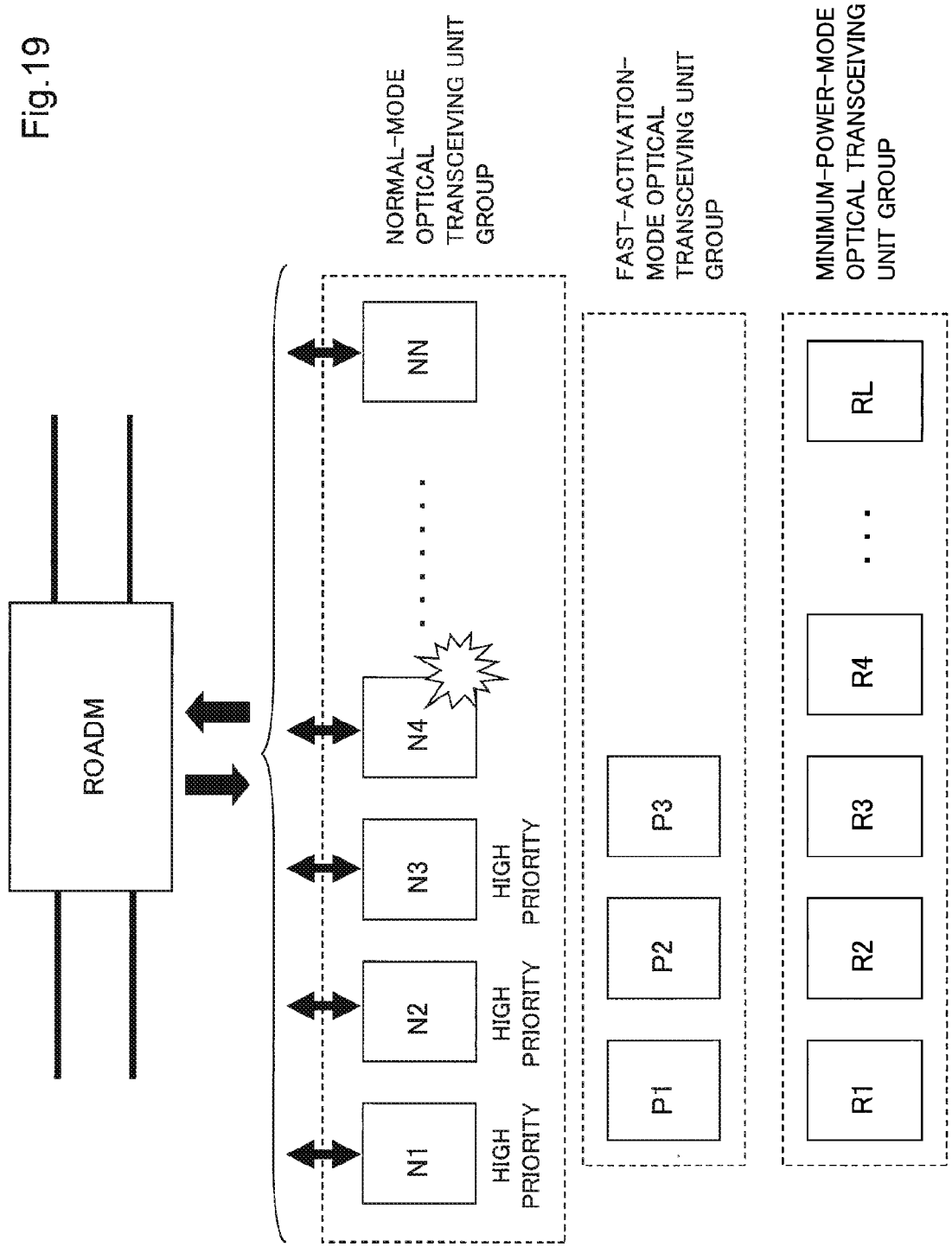
FIG. 19 is a diagram illustrating an exemplary configuration of the third embodiment of the present invention.

An operation will be described next that is performed when a failure occurs in a low-priority optical transceiving unit used in the normal mode. Assume that a failure has occurred in optical transceiving unit N4 that is not given a high priority and in the normal mode as illustrated in FIG. 19. Since failed optical transceiving unit N4 is of low priority rather than high priority, the control unit issues an instruction to transition to the normal mode to an optical transceiving unit in the minimum power mode. Assume that optical transceiving unit R4 in the minimum power mode is instructed to transition to the normal mode. Optical transceiving unit R4, which has received the instruction to transition to the normal mode, transitions to the normal mode. Upon completion of the transition, optical transceiving unit R4 sends information indicating the completion of the transition to the control unit. Upon reception of the information indicating the completion of the transition to the normal mode, the control unit issues an instruction to perform optical signal path switching to the optical switch unit. Upon reception of the instruction to perform optical signal path switching from the control unit, the optical switch unit performs path switching so as to allow optical transceiving unit R4 that has transitioned to the normal mode to perform optical signal transmission/reception performed by failed optical transceiving unit N4. Upon completion of the path switching, the optical switch unit notifies the control unit of the completion of the switching. Upon reception of the information indicating the completion of the path switching by the optical switch unit, the control unit performs optical signal transmission/reception at optical transceiving unit R4 which has transitioned to the normal mode. In addition, the control unit performs procedures such as powering off failed optical transceiving unit N4 as needed and completes the transition operation for failure recovery. FIG. 20 is a diagram illustrating a state where optical transceiving unit R4 has transitioned to the normal mode and N4 has been shut down.

FIG. 21 illustrates operations of optical transceiving units when optical transceiving unit R4 transitions to the normal mode in the event of a failure or the like in low-priority optical transceiving unit N4. The changes in the vertical direction in FIG. 21 represents that there were some changes in the operation status. Assume that an abnormality in optical transceiving unit N2 is detected at time Tdet2. When the control unit detects the abnormality, the control unit controls optical transceiving unit R4 to cause the setting at R4 to transition to the normal mode. Upon transition of optical transceiving unit R4 to the normal mode, the optical switch unit is controlled so that optical transceiving unit R4 is connected in place of N4. At this point in time, Tset2, optical signal transmission/reception is resumed and Tset2−Tdet2 is the time Δt2 required for the failure recovery. The time includes the time taken to transition from the minimum power mode which requires a longer time to transition to the normal mode than transition from the fast activation mode, therefore Δt1<Δt2. However, when a failure has occurred in a low-priority optical transceiving unit, slower transition to the normal mode is allowable. Therefore, priorities are set to allow for a transition operation that takes a long time. Optical transceiving unit N4 transitions to the shutdown state as needed. When an optical transceiving unit in the minimum power mode has been transitioned to the normal mode, no further transition operations from other standby modes are performed.

An example where a failure has occurred in one optical transceiving unit in the normal mode has been described in this embodiment. When two or more optical transceiving units has failed, transition as described above is made from the standby mode to the normal mode for as many optical transceiving units as the failed optical transceiving units. Furthermore, when failures occur in high-priority and low-priority optical transceiving units in the normal mode at the same time, transition of the operation mode of the high-priority optical transceiving unit is made first.

When a failure has occurred in a high-priority optical transceiving unit, quick response is required. Therefore, in this embodiment, transition is made from an optical transceiving unit in the fast activation mode, from which quick transition to the normal mode can be made. On the other hand, when a failure has occurred in a low-priority optical transceiving unit, slower transition to the normal mode is allowable than when a high-priority optical transceiving unit has failed, and therefore transition from the minimum power mode to the normal mode is made. By transitioning from the minimum power mode when a failure has occurred in a low-priority optical transceiving unit, the number of optical transceiving units on standby in the fast activation mode in which more standby power is consumed can be reduced. Consequently, the power consumption in the entire optical transmission device can be reduced while maintaining the reliability of the optical transmission device by the provision of backup optical transceiving units.

While low-priority optical transceiving units are caused to transition from the minimum power mode to the normal mode in this embodiment, optical transceiving units that transition from the fast activation mode to the normal mode may be provided besides optical transceiving units that transition from the minimum power mode to the normal mode may be provided.

While the predetermined criterion for giving priorities is ½ or more of the capacity of traffic in this embodiment, other criterion such as ⅓ or more of the capacity of traffic may be set as the criterion. Alternatively, priorities may be given according to other criterion such as the drive current values of optical transceiving units. If the drive current values are used as the predetermined criterion, a high priority may be given to an optical transceiving unit when its drive current value exceeds a certain current value, i.e. a threshold current; when the drive current value is less than or equal to the threshold current, a low priority may be given to the optical transceiving unit. FIG. 22 illustrates a graph in which the horizontal axis represents time of use of optical transceiving unit and the vertical axis represents drive current value. Since the semiconductor laser that an optical transceiving unit uses for emitting optical signals degrades with time, the drive current value gradually increases from the drive current value IO at the time immediately after the first use. A threshold Ith may be predetermined, an optical transceiving unit whose drive current value exceeds the threshold Ith may be given a high priority and an optical transceiving unit whose drive current value is less than or equal to the threshold Ith may be given a low priority.

A fourth embodiment of the present invention will now be described in detail with reference to FIG. 23. FIG. 23 illustrates an overview of a configuration of an optical transmission device according to the fourth embodiment. The optical transmission device of this embodiment includes optical switch means 40, a plurality of optical transceiving means 41, and control means 42. The optical switch means 40 outputs an input optical signal to a given path. Each optical transceiving means 41 receives an optical signal from the optical switch means 40 and transmits an optical signal to the optical switch means 40. The control means 42 controls the optical switch means 40 and the optical transceiving means 41. The optical transceiving means 41 operates in three different operation states: a normal mode in which the optical transceiving means transmits and receives optical signals, a first standby mode in which the optical transceiving means does not transmit nor receive optical signals, and a second standby mode in which power consumption in the standby state is smaller than that in the first standby mode. The control means 42 includes means for causing the optical transceiving means in the first standby mode to transition to the normal mode and causing the optical transceiving means in the second standby mode to transition to the first standby mode or the normal mode.

Since the optical transmission device of this embodiment includes a backup optical transceiving unit in a standby state in which some of the elements of the backup optical transceiving unit are active, quick switching can be made from an optical transceiving unit that is being used in optical signal transmission/reception to a backup optical transceiving unit. In the event of a failure in the optical transceiving unit, quick switching can be made to reduce the communication shutdown time. Accordingly, the reliability of the optical transmission device is improved. Furthermore, since backup optical transceiving units in two standby modes are provided, the number of optical transceiving means in the one of the standby modes in which more power is consumed can be reduced. Thus, in the optical transmission device according to this embodiment, both of improvement of the reliability and power saving can be achieved.

Some or all of the embodiments described above can be set forth as in the following supplementary notes but the present invention is not limited to the embodiments described below.

(Supplementary Note 1) An optical transmission device including optical switch means for outputting an input optical signal to a given path, a plurality of optical transceiving means for receiving an optical signal from the optical switch means and transmitting an optical signal to the optical switch means, and control means for controlling the optical switch means and the optical transceiving means, wherein the optical transceiving means includes means operating in three different operation states, which are a normal mode in which the optical transceiving means transmits and receives optical signals, a first standby mode which is a standby state in which the optical transceiving means does not transmit nor receive optical signals, and a second standby mode in which power consumption in a standby state is smaller than power consumption in the first standby mode, and the control means includes the means for causing optical transceiving means in the first standby mode to transition to the normal mode and causing optical transceiving means in the second standby mode to transition to the first standby mode or the normal mode.

(Supplementary Note 2) The optical transmission device according to Supplementary Note 1, wherein the time required for transition from the second standby mode to the first standby mode or the normal mode is longer than the time required for transition from the first standby mode to the normal mode.

(Supplementary Note 3) The optical transmission device according to Supplementary Note 1 or 2, wherein the control means includes means for causing the optical transceiving means in the first standby mode to transition to the normal mode and causing as many optical transceiving means in the second standby mode as the number of optical transceiving means that has transitioned from the first standby mode to the normal mode to transition to the first standby state.

(Supplementary Note 4) The optical transmission device according to any one of Supplementary Notes 1 to 3, wherein the number of optical transceiving means in the normal mode is greater than the number of optical transceiving means in the first standby mode.

(Supplementary Note 5) The optical transmission device according to any one of Supplementary Notes 1 to 4, further including monitor means for monitoring optical signal transmission and reception status in the optical transceiving means for abnormalities, wherein the control means includes means for, when the monitor means detects an abnormality, causing as many optical transceiving means in the first standby mode as the number of optical transceiving means that has failed in the normal mode to transition to the normal mode and causing the same number of optical transceiving means in the second standby mode to transition to the first standby mode.

(Supplementary Note 6) The optical transmission device according to any one of Supplementary Notes 1 to 5, wherein priorities are given to optical transceiving means in the normal mode according to a predetermined criterion, and the control means includes means for, when the monitor means detects an abnormality in a low-priority optical transceiving means in the normal mode, causing as many optical transceiving means in the second standby mode as the number of optical transceiving means in which the abnormality is detected in the normal mode to transition to the normal mode.

(Supplementary Note 7) The optical transmission device according to Supplementary Note 6, wherein the predetermined criterion is the amount of traffic.

(Supplementary Note 8) The optical transmission device according to Supplementary Note 6, wherein the predetermined criterion is a drive current value of a light source of the optical transceiving means.

(Supplementary Note 9) An optical network system including a plurality of optical transmission devices according to any one of Supplementary Notes 1 to 8.

(Supplementary Note 10) A control method for an optical transmission device, wherein optical transceiving means receiving and transmitting optical signals is placed in three different operation states, the three different operation states which are a normal mode in which the optical transceiving means transmits and receives optical signals, a first standby mode which is a standby state in which the optical transceiving means does not transmit nor receive optical signals, and a second standby mode in which power consumption in a standby state is smaller than power consumption in the first standby mode, and optical transceiving means in the first standby mode is caused to transition to the normal mode and optical transceiving means in the second standby mode is caused to transition to the first standby mode or the normal mode.

(Supplementary Note 11) The control method for an optical transmission device according to Supplementary Note 10, wherein the time required for transition from the second standby mode to the first standby mode or the normal mode is longer than the time required for transition from the first standby mode to the normal mode.

(Supplementary Note 12) The control method for an optical transmission device according to Supplementary Note 10 or 11, when optical transceiving means in the first standby mode is caused to transition to the normal mode, as many optical transceiving means in the second standby mode as the number of optical transceiving means that has transitioned from the first standby mode to the normal mode are caused to transition to the first standby state.

(Supplementary Note 13) The control method for an optical transmission device according to any one of Supplementary Notes 10 to 12, wherein the number of optical transceiving means in the normal mode is greater than the number of optical transceiving means in the first standby mode.

(Supplementary Note 14) The control method for an optical transmission device according to any one of Supplementary Notes 10 to 13, wherein optical signal transmission and reception status in the optical transceiving means is monitored for abnormalities, when an abnormality is detected, as many optical transceiving means in the first standby mode as the number of optical transceiving means that has failed in the normal mode are caused to transition to the normal mode, and the same number of optical transceiving means in the second standby mode are caused to transition to the first standby mode.

(Supplementary Note 15) The control method for an optical transmission device according to any one of Supplementary Notes 10 to 14, wherein priorities are given to optical transceiving means in the normal mode according to a predetermined criterion, and when an abnormality in a low-priority optical transceiving means in the normal mode is detected, as many optical transceiving means in the second standby mode as the number of optical transceiving means in which the abnormality is detected in the normal mode are caused to transition to the normal mode.

(Supplementary Note 16) The control method for an optical transmission device according to Supplementary Note 15, wherein the predetermined criterion is the amount of traffic.

(Supplementary Note 17) The control method for an optical transmission device according to Supplementary Note 15, wherein the predetermined criterion is a drive current value of a light source of the optical transceiving means.

While the present invention has been described with reference to embodiments thereof, the present invention is not limited to the embodiment described above. Various modifications that are apparent to those skilled in the art can be made to the configurations and details of the present invention within the scope of the present invention.

This application is based on and claims the priority of Japanese Patent Application No. 2012-164257 filed on 25 Jul. 2012, the entire disclosure of which is incorporated herein by reference.

INDUSTRIAL APPLICABILITY

The present invention is applicable to wavelength-division-multiplexing-based optical transmission devices and the like in the optical communication field.

REFERENCE SIGNS LIST

11 . . . Control unit
12 . . . Optical transceiving unit
13 . . . Transmission-side optical switch unit
14 . . . Reception-side optical switch unit
15 . . . Multiplexing unit
16 . . . Demultiplexing unit
21 . . . Optical add/drop multiplexing unit
22 . . . Optical switch unit
23 . . . Signal monitor unit
24 . . . Control unit
25 . . . Optical transceiving unit
30 . . . Optical transceiving unit
31 . . . Optical transmission/reception control unit
32 . . . Signal transmission/reception unit
33 . . . Signal generation unit
34 . . . Interface unit
35 . . . Monitor unit
36 . . . Monitor unit
40 . . . Optical switch means
41 . . . Optical transceiving means
42 . . . Control means
100 . . . Transmission path
101 . . . Demultiplexing unit
102 . . . Multiplexing unit
103 . . . Signal group to optical cross-connect unit
104 . . . Signal group from optical cross-connect unit
110 . . . Optical cross-connect unit

What is claimed is:

1. An optical transmission device comprising:
an optical switch unit which outputs an input optical signal to a given path;
a plurality of optical transceiving units, each of which receives an optical signal from the optical switch unit and transmits an optical signal to the optical switch unit; and
a control unit which controls the optical switch unit and the optical transceiving units;
wherein each optical transceiving unit comprises a unit which operates in a plurality of different operation states, the plurality of different operation states being a normal mode in which the optical transceiving unit transmits and receives optical signals, a first standby mode wherein the optical transceiving unit does not transmit nor receive optical signals, and a second standby mode in which power consumption is smaller than power consumption in the first standby mode; and
the control unit comprises a unit which causes the optical transceiving unit in the first standby mode to transition to the normal mode and causes the optical transceiving unit in the second standby mode to transition to the first standby mode or the normal mode; and
the optical transceiving units in the normal mode are configured to be assigned a priority based on a predetermined criterion; and
the control unit comprises a unit that controls the optical transceiving units so that when a monitor unit detects an abnormality in a low-priority optical transceiving unit in the normal mode, as many optical transceiving units in the second standby mode as the number of optical transceiving units in which the abnormality is detected in the normal mode transition to the normal mode.

2. The optical transmission device according to claim 1, wherein the time required for transition from the second standby mode to the first standby mode or the normal mode is longer than the time required for transition from the first standby mode to the normal mode.

3. The optical transmission device according to claim 1, wherein the control unit comprises a unit which causes the optical transceiving units in the first standby mode to transition to the normal mode and causes as many optical transceiving units in the second standby mode as the number of optical transceiving units that have transitioned from the first standby mode to the normal mode to transition to the first standby state.

4. The optical transmission device according to claim 1, wherein the number of optical transceiving units in the normal mode is greater than the number of optical transceiving units in the first standby mode.

5. The optical transmission device according to claim 1, further comprising a monitor unit which monitors optical signal transmission and reception status in the optical transceiving unit for abnormalities,
wherein the control unit comprises a unit that controls the optical transceiving units so that when the monitor unit detects an abnormality, as many optical transceiving units in the first standby mode as the number of optical transceiving units that have failed in the normal mode to transition to the normal mode, and causes the same number of optical transceiving units in the second standby mode to transition to the first standby mode.

6. The optical transmission device according to claim 1, wherein the predetermined criterion is the amount of traffic.

7. The optical transmission device according to claim 1, wherein the predetermined criterion is a drive current value of a light source of the optical transceiving unit.

8. An optical network system comprising a plurality of optical transmission devices according to claim 1.

9. A control method for an optical transmission device,
wherein an optical transceiving unit which receives and transmits optical signals is placed in a plurality of different operation states, the plurality of different operation states being a normal mode in which the optical transceiving unit transmits and receives optical signals, a first standby mode in which the optical transceiving unit does not transmit nor receive optical signals, and a second standby mode in which power consumption in a standby state is smaller than power consumption in the first standby mode; and
the optical transceiving unit in the first standby mode is caused to transition to the normal mode and the optical transceiving unit in the second standby mode is caused to transition to the first standby mode or the normal mode; and
priorities are given to the optical transceiving unit in the normal mode according to a predetermined criterion; and
when an abnormality in a low-priority optical transceiving unit in the normal mode is detected, as many optical transceiving units in the second standby mode as the number of optical transceiving units in which the abnormality is detected in the normal mode are caused to transition to the normal mode.

10. The control method for an optical transmission device according to claim 8, wherein the time required for transition from the second standby mode to the first standby mode or the normal mode is longer than the time required for transition from the first standby mode to the normal mode.

11. The control method for an optical transmission device according to claim 9, wherein when the optical transceiving unit in the first standby mode is caused to transition to the normal mode, as many optical transceiving units in the second standby mode as the number of optical transceiving units that has transitioned from the first standby mode to the normal mode are caused to transition to the first standby state.

12. The control method for an optical transmission device according to claim 9, wherein the number of optical transceiving units in the normal mode is greater than the number of optical transceiving units in the first standby mode.

13. The control method for an optical transmission device according to claim 9,
wherein optical signal transmission and reception status in the optical transceiving unit is monitored for abnormalities;
when an abnormality is detected, as many optical transceiving units in the first standby mode as the number of optical transceiving units that has failed in the normal mode are caused to transition to the normal mode; and
the same number of optical transceiving units in the second standby mode are caused to transition to the first standby mode.

14. The control method for an optical transmission device according to claim 9, wherein the predetermined criterion is the amount of traffic.

15. The control method for an optical transmission device according to claim 9, wherein the predetermined criterion is a drive current value of a light source of the optical transceiving unit.

* * * * *